United States Patent
Mao et al.

(10) Patent No.: US 11,870,275 B2
(45) Date of Patent: Jan. 9, 2024

(54) APPARATUS AND METHOD FOR DETECTING METAL FOREIGN MATTER IN WIRELESS CHARGING SYSTEM, AND DEVICE

(71) Applicant: HUAWEI TECHNOLOGIES CO., LTD., Shenzhen (CN)

(72) Inventors: Yunhe Mao, Shenzhen (CN); Zhixian Wu, Dongguan (CN); Yanding Liu, Dongguan (CN); Furong Xiao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 591 days.

(21) Appl. No.: 17/134,084

(22) Filed: Dec. 24, 2020

(65) Prior Publication Data
US 2021/0119494 A1    Apr. 22, 2021

Related U.S. Application Data

(63) Continuation of application No. PCT/CN2019/088204, filed on May 23, 2019.

(30) Foreign Application Priority Data

Jun. 25, 2018    (CN) .......................... 201810668923.2

(51) Int. Cl.
    *H02J 50/60*    (2016.01)
    *H02J 50/12*    (2016.01)
    *B60L 53/124*    (2019.01)

(52) U.S. Cl.
    CPC .............. *H02J 50/60* (2016.02); *H02J 50/12* (2016.02); *B60L 53/124* (2019.02); *H02J 2310/48* (2020.01)

(58) Field of Classification Search
    CPC ........ H02J 50/60; H02J 50/12; H02J 2310/48; B60L 53/124
    (Continued)

(56) References Cited

U.S. PATENT DOCUMENTS

2006/0071632 A1    4/2006    Ghabra et al.
2012/0169133 A1    7/2012    Lisi et al.
(Continued)

FOREIGN PATENT DOCUMENTS

CN    101860087 A    10/2010
CN    202444333 U    9/2012
(Continued)

OTHER PUBLICATIONS

Colm Slattery et al., Digital waveform generator provides flexible frequency tuning for sensorimpedance measurement. Sep. 28, 2005, 4 pages.
(Continued)

*Primary Examiner* — Suchin Parihar

(57) ABSTRACT

An apparatus and a method for detecting a metal foreign matter in a wireless charging system, and a device are provided. The apparatus includes a phase-lock control module, an excitation module, a resonance module, a signal collection module, and a determining module. The phase-lock control module is configured to: adjust a frequency of a first signal and output the first signal to the excitation module and the determining module. The excitation module is configured to: generate a second signal based on the first signal, and output the second signal to the resonance module. The resonance module is configured to output the third signal to the signal collection module under excitation of the second signal. The determining module is configured to determine whether there is a metal foreign matter in an area of the target coil.

20 Claims, 12 Drawing Sheets

(58) Field of Classification Search
USPC .......................................................... 320/108
See application file for complete search history.

(56)  References Cited

U.S. PATENT DOCUMENTS

| | | |
|---|---|---|
| 2014/0015329 A1 | 1/2014 | Widmer et al. |
| 2014/0340031 A1* | 11/2014 | Mi ........................... H01F 3/10 |
| | | 320/108 |
| 2015/0084586 A1 | 3/2015 | Von Novak, III et al. |
| 2015/0109000 A1 | 4/2015 | Sieber et al. |
| 2015/0285926 A1* | 10/2015 | Oettinger ................ H02J 50/70 |
| | | 307/104 |
| 2016/0187519 A1* | 6/2016 | Widmer ................... G01V 3/10 |
| | | 324/222 |
| 2016/0187520 A1* | 6/2016 | Widmer .................. H02J 50/60 |
| | | 324/227 |
| 2016/0301262 A1* | 10/2016 | Patino ..................... H02J 50/60 |
| 2017/0324484 A1* | 11/2017 | Saada ................... H04B 1/1027 |
| 2019/0068002 A1* | 2/2019 | Liang ........................ H02J 50/60 |
| 2020/0358445 A1* | 11/2020 | Northcutt .................. H03H 9/13 |
| 2020/0373923 A1* | 11/2020 | Walsh ............... H03K 17/9547 |
| 2021/0119494 A1* | 4/2021 | Mao ........................ H02J 50/12 |
| 2021/0210991 A1* | 7/2021 | He ........................ B60L 53/124 |
| 2021/0249889 A1* | 8/2021 | Mao ........................ H03L 7/099 |
| 2021/0265871 A1* | 8/2021 | Chabaan ................ G01V 3/104 |

FOREIGN PATENT DOCUMENTS

| | | |
|---|---|---|
| CN | 103607799 B | 2/2016 |
| CN | 105790324 A | 7/2016 |
| CN | 106371143 A | 2/2017 |
| CN | 106696738 A | 5/2017 |
| CN | 106787249 A | 5/2017 |
| CN | 107070003 A | 8/2017 |
| CN | 107078518 A | 8/2017 |
| CN | 107248788 A | 10/2017 |
| CN | 109038850 A | 12/2018 |
| JP | 2015057020 A | 3/2015 |

OTHER PUBLICATIONS

Extended European Search Report issued in EP 19826304.8, dated Jul. 20, 2021, 9 pages.

* cited by examiner

APPARATUS AND METHOD FOR DETECTING METAL FOREIGN MATTER IN WIRELESS CHARGING SYSTEM, AND DEVICE

CROSS-REFERENCE TO RELATED APPLICATIONS

This application is a continuation of International Application No. PCT/CN2019/088204, filed on May 23, 2019, which claims priority to Chinese Patent Application No. 201810668923.2, filed on Jun. 25, 2018. The disclosures of the aforementioned applications are hereby incorporated by reference in their entireties.

TECHNICAL FIELD

This application relates to the field of wireless charging technologies, and in particular, to an apparatus and a method for detecting a metal foreign matter in a wireless charging system, and a device.

BACKGROUND

In wireless charging technologies, energy transmission is performed by using an electromagnetic field or an electromagnetic wave, so that a charger is not limited by a line, thereby implementing complete separation between a to-be-charged device and a power source. Therefore, such a charger has advantages over a conventional charger in safety (for example, no electric spark and no electric shock risk), flexibility (for example, being adapted to a variety of adverse circumstances and facilitating implementation of unmanned automatic charging and mobile charging), and other aspects.

However, when there is a metal foreign matter between a transmit coil of a wireless charger and a receive coil of a to-be-charged device and a current exists in the transmit coil or the receive coil, an eddy current is generated in the metal foreign matter due to electromagnetic induction. As a result, the metal becomes hot, and even the metal may suffer spontaneous combustion (for example, tin foil paper suffers spontaneous combustion when a temperature of the tin foil paper reaches a specific high temperature) or other objects near the metal foreign matter may burn (leaves, scraps of paper, and the like that are on the metal foreign matter burn because the metal becomes hot). Therefore, to ensure safety of the wireless charger and the to-be-charged device in a wireless charging system, whether there is a metal foreign matter between the transmit coil of the wireless charger and the receive coil of the to-be-charged device needs to be detected.

In the prior art, a resonant circuit including a foreign-matter detection coil and a resonant capacitor is usually used to detect whether there is a metal foreign matter between the transmit coil of the wireless charger and the receive coil of the to-be-charged device. When there is no metal foreign matter between the transmit coil of the wireless charger and the receive coil of the to-be-charged device, an inductance of the foreign-matter detection coil is L1. When there is a metal foreign matter between the transmit coil of the wireless charger and the receive coil of the to-be-charged device, an inductance of a foreign-matter sensing coil changes to L2 due to mutual inductance, and then a resonance frequency of the resonant circuit, an amplitude of a signal that is output by the resonant circuit, and a phase of the signal that is output by the resonant circuit change. In this case, when a resonance occurs in the resonant circuit under excitation of signals at different frequencies that are output by a frequency sweeping excitation source, a parameter of the output signal if there is a metal foreign matter between the transmit coil of the wireless charger and the receive coil of the to-be-charged device is compared with a parameter of the output signal if there is no metal foreign matter between the transmit coil of the wireless charger and the receive coil of the to-be-charged device, to determine whether there is a metal foreign matter between the transmit coil of the wireless charger and the receive coil of the to-be-charged device.

However, when the resonant circuit including the foreign-matter detection coil and the resonant capacitor is used to detect whether there is a metal foreign matter between the transmit coil of the wireless charger and the receive coil of the to-be-charged device, each area of the transmit coil of the wireless charger needs to be detected through frequency sweeping excitation, a frequency of the excitation source needs to be adjusted during each detection to make a resonance occur in the resonant circuit, and then a corresponding parameter is obtained. As a result, both a data computation amount (such as fast Fourier transform analysis) and a data storage amount are quite large, and requirements for hardware and software are higher, causing great implementation difficulty.

SUMMARY

This application provides an apparatus and a method for detecting a metal foreign matter in a wireless charging system, and a device, to resolve a prior-art problem of a relatively large data computation amount and data storage amount in a solution for detecting a metal foreign matter in a wireless charging system.

According to a first aspect, this application provides an apparatus for detecting a metal foreign matter in a wireless charging system. The wireless charging system includes a wireless charger and a to-be-charged device. The apparatus includes a phase-lock control module, an excitation module, a resonance module, a signal collection module, and a determining module, where an output end of the phase-lock control module is connected to all of a first input end of the phase-lock control module, an input end of the excitation module, and an input end of the determining module, a second input end of the phase-lock control module is connected to an output end of the signal collection module, an input end of the signal collection module is connected to an output end of the resonance module, and an input end of the resonance module is connected to an output end of the excitation module;

the phase-lock control module is configured to output a first signal to the excitation module, where the first signal is used to control a frequency of a second signal generated by the excitation module; the excitation module is configured to: generate the second signal based on the first signal, and output the second signal to the resonance module, where the frequency of the second signal is determined based on a frequency of the first signal, and the second signal is used to excite the resonance module; the resonance module includes at least one foreign-matter detection coil and at least one resonant capacitor, and is configured to generate a third signal under excitation of the second signal by using a resonant circuit including a target coil and a target capacitor, where the at least one foreign-matter detection coil is connected to the at least one resonant capacitor, the target coil is one or more of the at least one foreign-matter detection coil, the target capacitor is one or more of the at least one resonant capacitor, the at least one foreign-matter detection coil is distributed above a transmit coil of the wireless charger or a receive coil of the to-be-charged device, and an area of the at least one foreign-matter detection coil can cover an area of the transmit coil or an area of the receive coil; the signal collection module is configured to: collect the third signal, and output the third signal to the phase-lock control module; the phase-lock control module is further configured to adjust the frequency of the output first signal based on a difference between a phase of the first signal and a phase of the third signal, where a difference between a phase of the frequency-adjusted first signal and the phase of the third signal is less than a first specified value, and a frequency of the second signal that is generated by the excitation module based on the frequency-adjusted first signal is the same as a resonance frequency of the resonant circuit; and the determining module is configured to determine, based on the frequency-adjusted first signal and a corresponding parameter value of a pre-stored fourth signal, whether there is a metal foreign matter in an area of the target coil, where the fourth signal is a signal that is output by the resonant circuit in a resonant state when there is no metal foreign matter in the area of the target coil.

According to the solution, the apparatus for detecting a metal foreign matter in the wireless charging system can control, by using the first signal that is output by the phase-lock control module, the frequency of the second signal that is output by the excitation module and that is used to excite the resonance module; and the phase-lock control module can adjust the frequency of the first signal that is output by the phase-lock control module, based on the third signal that is output by the resonance module under excitation of the second signal and that is collected by the signal collection module and the first signal that is output by the phase-lock control module. Because the difference between the phase of the adjusted first signal and the phase of the third signal is less than the first specified value, the frequency of the second signal that is generated and output by the excitation module reaches the resonance frequency of the resonant circuit that is in the resonance module and that includes the target coil and the target resonant capacitor, and then a resonance occurs. In this case, the determining module may determine, based on the frequency-adjusted first signal that is output by the phase-lock control module and the pre-stored fourth signal, whether there is a metal foreign matter in the area of the target coil, or determine, based on the difference between the phase of the first signal and the phase of the third signal and the fourth signal, whether there is a metal foreign matter in the area of the target coil.

In other words, through closed-loop control of the phase-lock control module, the apparatus for detecting a metal foreign matter in the wireless charging system provided in this embodiment of this application can make the second signal that is output by the excitation module excite the resonant circuit that is in the resonance module and that includes the target coil and the target capacitor, to cause a resonance. In this way, frequency sweeping excitation, complex computation and analysis, and a large amount of data processing do not need to be performed to obtain the resonance frequency of the resonant circuit including the foreign-matter detection coil, to make a resonance occur in the resonant circuit. In comparison with the prior art, control precision is higher and a computation amount is smaller in this embodiment of this application. This can effectively simplify a metal foreign matter detection process in the wireless charging system.

In a possible implementation, the determining module is specifically configured to: when a difference between a frequency of the frequency-adjusted first signal and a frequency of the fourth signal is less than a second specified value, determine that there is no metal foreign matter in the area of the target coil; or when a difference between a frequency of the frequency-adjusted first signal and a frequency of the fourth signal is greater than or equal to the second specified value, determine that there is a metal foreign matter in the area of the target coil.

In a possible implementation, the phase-lock control module may be a phase-locked loop chip, or may be implemented by a combination of discrete devices or a combination of corresponding chips. When the phase-lock control module is implemented by a combination of discrete devices or a combination of corresponding chips, the implementation may include but is not limited to any one of the following several manners:

Manner 1: The phase-lock control module may include a phase detector and a voltage-controlled oscillator. An input end of the voltage-controlled oscillator is connected to an output end of the phase detector, an output end of the voltage-controlled oscillator is connected to all of a first input end of the phase detector, the input end of the determining module, and the input end of the excitation module, and a second input end of the phase detector is connected to the output end of the signal collection module, where the phase detector is configured to: generate a fifth signal based on the difference between the phase of the first signal and the phase of the third signal, and output the fifth signal to the voltage-controlled oscillator; and the voltage-controlled oscillator is configured to generate the frequency-adjusted first signal based on the fifth signal.

Manner 2: The phase-lock control module may include a phase detector and a voltage-controlled oscillator. An output end of the voltage-controlled oscillator is connected to both a first input end of the phase detector and the input end of the excitation module, a second input end of the phase detector is connected to the output end of the signal collection module, and an output end of the phase detector is connected to both an input end of the voltage-controlled oscillator and the input end of the determining module, where the phase detector is configured to: generate a fifth signal based on the difference between the phase of the first signal and the phase of the third signal, and output the fifth signal to the voltage-controlled oscillator and the determining module; and the voltage-controlled oscillator is configured to generate the frequency-adjusted first signal based on the fifth signal.

Manner 3: The phase-lock control module may include a phase detector, a filter, and a voltage-controlled oscillator. An output end of the voltage-controlled oscillator is connected to both a first input end of the phase detector and the input end of the excitation module, a second input end of the phase detector is connected to the output end of the signal collection module, an output end of the phase detector is connected to an input end of the filter, and an output end of the filter is connected to both an input end of the voltage-controlled oscillator and the input end of the determining module, where the phase detector is configured to: generate a fifth signal based on the difference between the phase of the first signal and the phase of the third signal, and output the fifth signal to the filter;

the filter is configured to: filter out a harmonic component of the fifth signal, and output a filtered fifth signal to the voltage-controlled oscillator and the determining module; and the voltage-controlled oscillator is configured to generate the frequency-adjusted first signal based on the filtered fifth signal.

In a possible implementation, the phase-lock control module in Manner 1 or Manner 2 may further include a filter. An input end of the filter is connected to the output end of the phase detector, and an output end of the filter is connected to the input end of the voltage-controlled oscillator; and the filter is configured to: filter out a harmonic component of the fifth signal, and output a filtered fifth signal to the voltage-controlled oscillator.

According to the solution, the filter can filter out an interfering signal in the fifth signal, to improve control precision of the phase-lock control module, so that the phase of the first signal is closer to the phase of the third signal.

In a possible implementation, when the phase-lock control module is of the structure described in Manner 2, the determining module is specifically configured to: when a difference between an amplitude of the fifth signal and an amplitude of the fourth signal is less than a second specified value, determine that there is no metal foreign matter in the area of the target coil; or when a difference between corresponding parameter values of the fifth signal and the fourth signal is greater than or equal to the second specified value, determine that there is a metal foreign matter in the area of the target coil.

In a possible implementation, when the phase-lock control module is of the structure described in Manner 3, the determining module is specifically configured to: when a difference between an amplitude of the filtered fifth signal and an amplitude of the fourth signal is less than a second specified value, determine that there is no metal foreign matter in the area of the target coil; or when a difference between corresponding parameter values of the filtered fifth signal and the fourth signal is greater than or equal to a second specified value, determine that there is a metal foreign matter in the area of the target coil.

In a possible implementation, the excitation module may be implemented, for example, in either of the following two manners:

Manner A: The excitation module may be a first power amplifier. An output end of the first power amplifier is connected to both a first input end of the first power amplifier and the input end of the resonance module, and a second input end of the first power amplifier is connected to the output end of the phase-lock control module.

Manner B: The excitation module may be a voltage-type converter or a current-type converter. The voltage-type converter and the current-type converter each may be a half bridge converter, a full bridge converter, or another circuit structure. When the third signal that is output by the excitation module cannot drive the voltage-type converter and the current-type converter, the excitation module may further include a second power amplifier. An output end of the second power amplifier is connected to both a first output end of the second power amplifier and an input end of the voltage-type converter (or the current-type converter), and an output end of the voltage-type converter (or the current-type converter) is connected to the input end of the resonance module.

Manner C: The excitation module may be an amplification circuit (for example, a push-pull circuit) including components such as transistors.

In a possible implementation, the resonance module further includes at least one switch, and the at least one foreign-matter detection coil and the at least one resonant capacitor are connected in parallel and/or in series through the at least one switch.

In a possible implementation, to detect a plurality of types of metal foreign matters made of different materials and further improve accuracy of a detection result, the resonance module includes a plurality of resonant capacitors. The plurality of resonant capacitors are connected to the at least one foreign-matter detection coil through the at least one switch, so that one target coil and capacitors with different capacitances may form a resonant circuit with different resonance frequencies, thereby implementing detection of metal foreign matters made of different materials.

In a possible implementation, the target coil and the target capacitor in the resonance module may form an LC series resonant circuit; the target coil and the target capacitor may form an LC parallel resonant circuit; the target coil and the target capacitor may form an LCC resonant circuit; the target coil and the target capacitor may form a CCL resonant circuit; or the resonance module further includes at least one resonant inductor, and the target coil, the target capacitor, and the at least one resonant inductor may form an LCL resonant circuit.

In a possible implementation, the apparatus may further include a charging control module. The charging control module is connected to all of the at least one switch, an output end of the determining module, and the transmit coil, and is configured to: control a status of the at least one switch, and control a working status of the transmit coil based on a determining result of the determining module; or the charging control module is connected to all of the at least one switch, an output end of the determining module, and the receive coil, and is configured to: control a status of the at least one switch, and control a working status of the receive coil based on a determining result of the determining module.

In a possible implementation, the apparatus may further include a signal processing module. An input end of the signal processing module is connected to the output end of the signal collection module, and an output end of the signal processing module is connected to the second input end of the phase-lock control module; and when the first signal that is output by the phase-lock control module is a digital signal, the signal processing module is configured to: convert the third signal into a digital signal, and output the digital signal corresponding to the third signal to the second input end of the phase-lock control module.

In a possible implementation, when a type of the first signal (a digital signal or an analog signal) output by the phase-lock control module is different from a type of the fourth signal stored in the determining module, the apparatus further includes a digital-to-analog conversion module or an analog-to-digital conversion module, so that the type of the signal to be compared by the determining module is the same as that of the fourth signal.

According to a second aspect, this application further provides a method for detecting a metal foreign matter in a wireless charging system, where the method is applied to an apparatus for detecting a metal foreign matter in the wireless charging system. The apparatus includes a phase-lock control module, an excitation module, a resonance module, a signal collection module, and a determining module, where an output end of the phase-lock control module is connected to all of a first input end of the phase-lock control module, an input end of the excitation module, and an input end of the determining module, a second input end of the phase-lock control module is connected to an output end of the signal collection module, an input end of the signal collection module is connected to an output end of the resonance module, and an input end of the resonance module is connected to an output end of the excitation module. The method includes: outputting, by the phase-lock control module, a first signal to the excitation module, where the first signal is used to control a frequency of a second signal generated by the excitation module; generating, by the excitation module, the second signal based on the first signal, and outputting the second signal to the resonance module, where the frequency of the second signal is determined based on a frequency of the first signal, and the second signal is used to excite the resonance module; generating, by a resonant circuit including a target coil and a target capacitor in the resonance module, a third signal under excitation of the second signal, where the resonance module includes at least one foreign-matter detection coil and at least one resonant capacitor, the at least one foreign-matter detection coil is connected to the at least one resonant capacitor, the target coil is one or more of the at least one foreign-matter detection coil, the target capacitor is one or more of the at least one resonant capacitor, the at least one foreign-matter detection coil is distributed above a transmit coil of the wireless charger or a receive coil of the to-be-charged device, and an area of the at least one foreign-matter detection coil can cover an area of the transmit coil or an area of the receive coil; collecting, by the signal collection module, the third signal, and outputting the collected third signal to the phase-lock control module; adjusting, by the phase-lock control module, the frequency of the output first signal based on a difference between a phase of the first signal and a phase of the third signal, where a difference between a phase of the frequency-adjusted first signal and the phase of the third signal is less than a first specified value, and a frequency of the second signal that is generated by the excitation module based on the frequency-adjusted first signal is the same as a resonance frequency of the resonant circuit; and determining, by the determining module based on the frequency-adjusted first signal and a pre-stored fourth signal, whether there is a metal foreign matter in an area of the target coil, or determining, based on the fourth signal and the difference between the phase of the first signal and the phase of the third signal, whether there is a metal foreign matter in an area of the target coil, where the fourth signal is a signal that is output by the resonant circuit in a resonant state when there is no metal foreign matter in the area of the target coil.

According to the method, the phase-lock control module controls, by using the output first signal, the frequency of the second signal that is output by the excitation module and that is used to excite the resonance module; and the phase-lock control module can further adjust the frequency of the first signal that is output by the phase-lock control module, based on the third signal that is output by the resonance module under excitation of the second signal and that is collected by the signal collection module and the first signal that is output by the phase-lock control module. Because the difference between the phase of the adjusted first signal and the phase of the third signal is less than the first specified value, the frequency of the second signal that is generated and output by the excitation module reaches the resonance frequency of the resonant circuit that is in the resonance module and that includes the target coil and the target resonant capacitor, and then a resonance occurs. In this case, the determining module may determine, based on the frequency-adjusted first signal and the pre-stored fourth signal, whether there is a metal foreign matter in the area of the target coil, or determine, based on the difference between the phase of the first signal and the phase of the third signal and the fourth signal, whether there is a metal foreign matter in the area of the target coil.

In a possible implementation, the determining module may use the following method to determine whether there is a metal foreign matter in the area of the target coil: when a difference between a frequency of the frequency-adjusted first signal and a frequency of the fourth signal is less than a second specified value, determining, by the determining module, that there is no metal foreign matter in the area of the target coil; or when a difference between a frequency of the frequency-adjusted first signal and a frequency of the fourth signal is greater than or equal to the second specified value, determining, by the determining module, that there is a metal foreign matter in the area of the target coil.

In a possible implementation, the phase-lock control module adjusts the frequency of the output first signal according to the following steps: generating, by the phase-lock control module, a fifth signal based on the difference between the phase of the first signal and the phase of the third signal, and generating the frequency-adjusted first signal based on the fifth signal.

In a possible implementation, the determining module may use the following method to determine whether there is a metal foreign matter in the area of the target coil: when a difference between an amplitude of the fifth signal and an amplitude of the fourth signal is less than a second specified value, determining, by the determining module, that there is no metal foreign matter in the area of the target coil; or when a difference between an amplitude of the fifth signal and an amplitude of the fourth signal is greater than or equal to the second specified value, determining, by the determining module, that there is a metal foreign matter in the area of the target coil.

In a possible implementation, the resonance module further includes at least one switch, and the at least one foreign-matter detection coil and the at least one resonant capacitor are connected in parallel and/or in series through the at least one switch; the apparatus further includes a charging control module, and in a scenario in which the charging control module is connected to all of the at least one switch, an output end of the determining module, and the transmit coil, before the excitation module outputs the second signal to the resonance module, the charging control module controls a status of the at least one switch, and selects the target coil and the target capacitor; and after the determining module determines whether there is a metal foreign matter in the area of the target coil, the charging control module may further control a working status of the transmit coil based on a determining result of the determining module.

In a possible implementation, the resonance module further includes at least one switch, and the at least one foreign-matter detection coil and the at least one resonant capacitor are connected in parallel and/or in series through the at least one switch; the apparatus further includes a charging control module, and in a scenario in which the charging control module is connected to all of the at least one switch, an output end of the determining module, and the transmit coil, before the excitation module outputs the second signal to the resonance module, the charging control module controls a status of the at least one switch, and selects the target coil and the target capacitor; and after the determining module determines whether there is a metal foreign matter in the area of the target coil, the charging control module may further control a working status of the receive coil based on a determining result of the determining module.

According to a third aspect, this application further provides a wireless charger. The wireless charger includes the apparatus for detecting a metal foreign matter in the wireless charging system provided in any implementation of the first aspect.

According to a fourth aspect, this application further provides a device supporting a wireless charging function. The device supporting a wireless charging function includes the apparatus for detecting a metal foreign matter in the wireless charging system provided in any implementation of the first aspect.

DESCRIPTION OF EMBODIMENTS

Figure 1:
FIG. 1 is a schematic structural diagram of a wireless charging system according to an embodiment of this application.

When there is a metal foreign matter in a wireless charging system (particularly, an electromagnetically induced non-contact wireless charging system), that is, there is a metal foreign matter on a surface of a transmit coil of a wireless charger or a surface of a receive coil of a to-be-charged device, and an induced current exists in the transmit coil or the receive coil, an eddy current is generated in the metal foreign matter due to electromagnetic induction. As a result, the metal becomes hot, and even the metal suffers spontaneous combustion or other objects near the metal foreign matter burn, causing potential safety hazards to the wireless charging system and objects surrounding the wireless charging system.

In the prior art, a resonant circuit including a foreign-matter detection coil and a resonant capacitor is usually used to detect whether there is a metal foreign matter between the transmit coil of the wireless charger and the receive coil of the to-be-charged device. However, when the resonant circuit including the foreign-matter detection coil and the resonant capacitor is used to detect whether there is a metal foreign matter between the transmit coil of the wireless charger and the receive coil of the to-be-charged device, each area of the transmit coil of the wireless charger needs to be detected through frequency sweeping excitation, a frequency of the excitation source needs to be adjusted during each detection to make a resonance occur in the resonant circuit, and then a corresponding parameter is obtained. As a result, both a data computation amount (such as fast Fourier transform analysis) and a data storage amount are quite large, and requirements for hardware and software that are used for detection are relatively high.

To resolve the foregoing prior-art problems, this application provides an apparatus and a method for detecting a metal foreign matter in a wireless charging system, and a device. The method and the apparatus are based on a same inventive concept. A problem-resolving principle of the method is similar to that of the apparatus, and therefore an apparatus embodiment and a method apparatus can be mutually referenced. Repetition is not elaborated again.

It should be understood that in the descriptions of the embodiments of this application, "a plurality of" means two or more; terms such as "first" and "second" are only used for description differentiation, but cannot be understood as indication or implication of relative importance and cannot be understood as indication or implication of sequences.

The apparatus and the method for detecting a metal foreign matter in the wireless charging system, and the device that are provided in this application are applicable to at least one of the following scenarios: Before a wireless charger charges a to-be-charged device (a device supporting a wireless charging function), whether there is a metal foreign matter on a surface of a transmit coil of the wireless charger or a surface of a receive coil of the to-be-charged device is detected, and then whether a charging function of the wireless charger or a charging function of the to-be-charged device is to be enabled is determined. In a process of charging the to-be-charged device by the wireless charger, whether there is a metal foreign matter on a surface of a transmit coil of the wireless charger or a surface of a receive coil of the to-be-charged device is detected, and then whether transmit power of the wireless charger is to be adjusted is determined or whether a charging function of the wireless charger is to be disabled (or whether a charging function of the to-be-charged device is to be disabled) is determined. Generally, when the wireless charging system works, the to-be-charged device is located above the wireless charger, and a probability that there is a metal foreign matter on the surface of the transmit coil of the wireless charger is relatively high. Therefore, the apparatus and the method for detecting a metal foreign matter in the wireless charging system, and the device that are provided in this application are mainly used to detect whether there is a metal foreign matter on the surface of the transmit coil of the wireless charger.

As shown in FIG. 1, the apparatus and the method for detecting a metal foreign matter in the wireless charging system, and the device that are provided in this application are applied to the wireless charging system. The wireless charging system includes a wireless charger 101 and a to-be-charged device 102 supporting a wireless charging function. The wireless charger 101 is connected to a power source, and is configured to send energy of the power source connected to the wireless charger 101 to the to-be-charged device 102 in a form of an electromagnetic wave. The to-be-charged device 102 is configured to receive the electromagnetic wave sent by the wireless charger, and the to-be-charged device is charged by using the energy in the form of the received electromagnetic wave.

The following details the wireless charging system by using an example in which the wireless charger 101 is a wireless charging station and the to-be-charged device 102 is an electric automobile.

Figure 2:
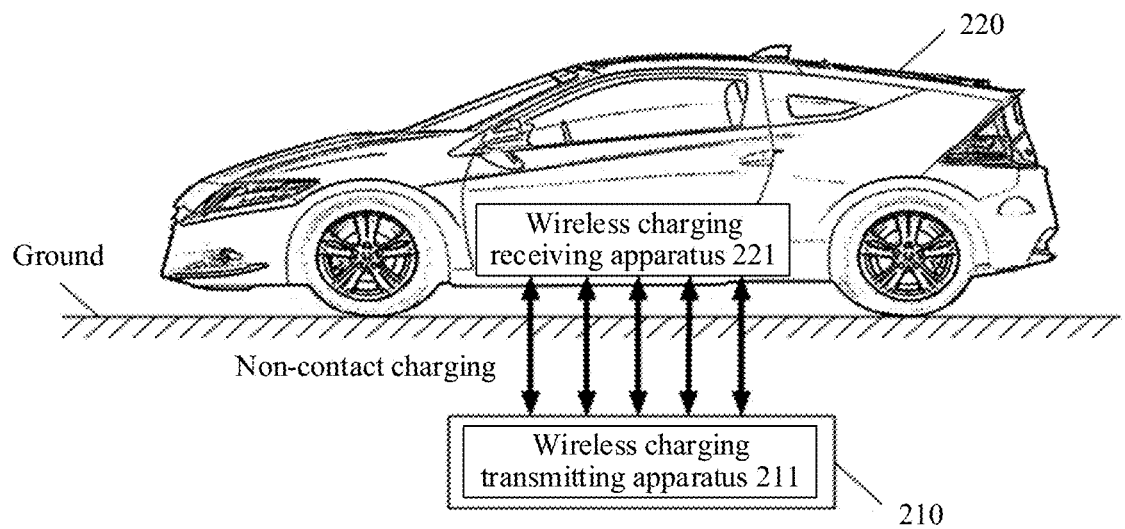
FIG. 2 is a schematic structural diagram of a wireless charging system for charging an electric automobile according to an embodiment of this application.

As shown in FIG. 2, the wireless charging station 210 includes a wireless charging transmitting apparatus 211. The wireless charging station 210 may be a fixed wireless charging station, a fixed wireless parking space, a wireless charging road, or the like. The wireless charging transmitting apparatus 211 may be disposed on the ground, half-buried in the ground, or buried beneath the ground (FIG. 2 illustrates a case in which the wireless charging transmitting apparatus 211 is buried beneath the ground), and is configured to wirelessly charge an electric automobile 220 located above the wireless charging transmitting apparatus 211. The wireless charging transmitting apparatus 211 includes a power transmit coil and an inverter circuit. The power transmit coil and the inverter circuit may be integrated, or may be disposed separately. The wireless charging station 210 may be disposed in various scenarios such as a parking lot, a private parking space, and a platform of a charging station.

The electric automobile 220 includes a wireless charging receiving apparatus 221, and the wireless charging receiving apparatus 221 may be integrated on a bottom of the electric automobile 220. When the electric automobile 220 enters a wireless charging range of the wireless charging transmitting apparatus 211, the electric automobile 220 can be charged in a wireless charging manner. The wireless charging receiving apparatus 221 includes a power receive coil and a rectifier circuit. The power receive coil and the rectifier circuit may be integrated, or may be disposed separately. When the power receive coil and the rectifier circuit in the wireless charging receiving apparatus 221 are separated, a rectifier module of the wireless charging receiving apparatus 221 is usually disposed within the automobile.

Wireless energy transmission may be performed between the wireless charging transmitting apparatus 211 and the wireless charging receiving apparatus 221 in an electric field or magnetic field coupling manner, for example, in an electric field induction manner, a magnetic induction manner, a magnetic resonance manner, or a wireless radiation manner, to implement non-contact wireless charging. A manner of wireless energy transmission between the wireless charging transmitting apparatus 211 and the wireless charging receiving apparatus 221 is not specifically limited in this embodiment of this application.

Further, two-way charging may alternatively be implemented between the electric automobile 220 and the wireless charging station 210. To be specific, the wireless charging station 210 may charge the electric automobile 220 by using a power source, or the electric automobile 220 may charge the power source.

Figure 3:
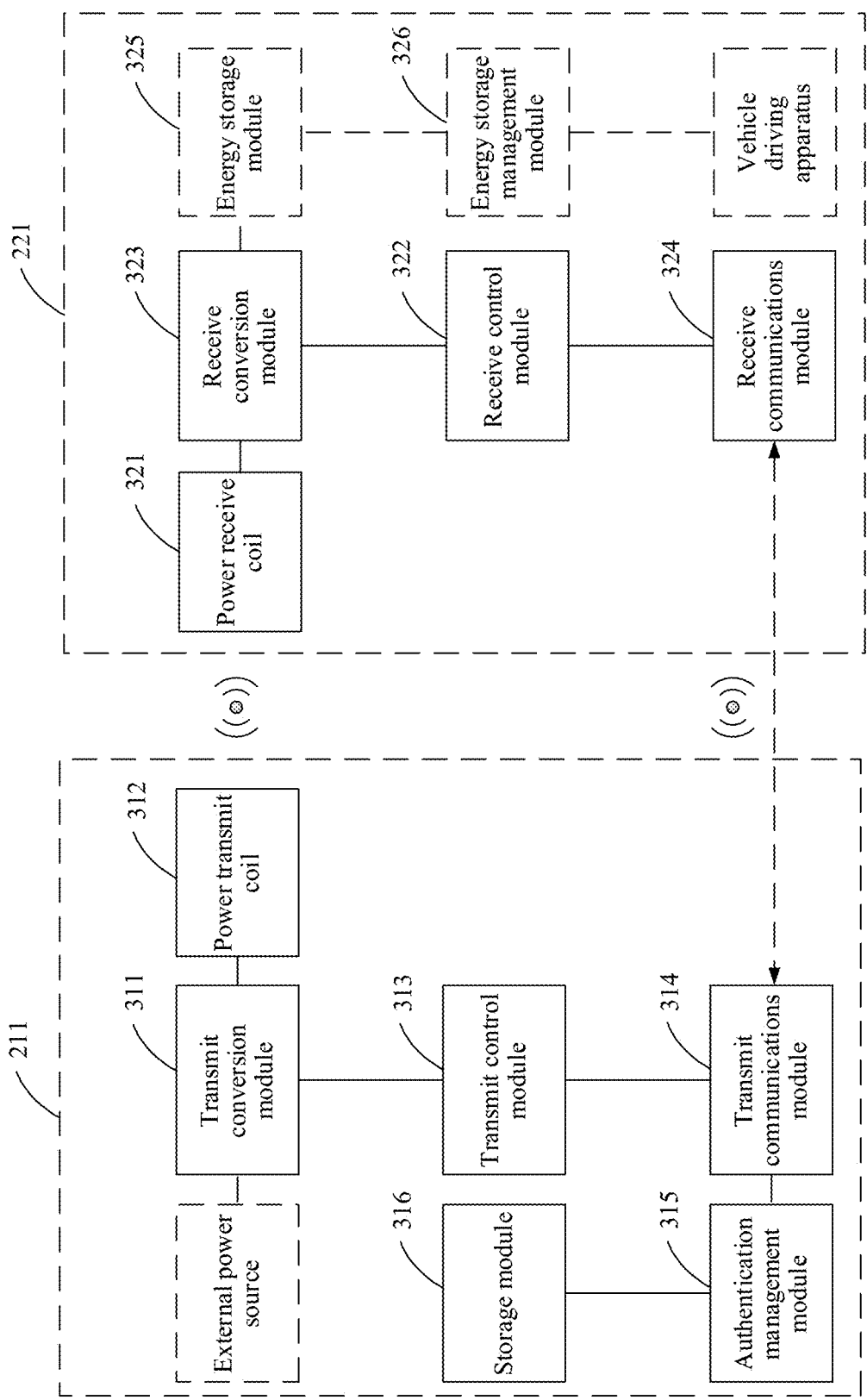
FIG. 3 is a schematic structural diagram of a wireless charging transmitting apparatus and a wireless charging receiving apparatus according to an embodiment of this application.

FIG. 3 (left) is a schematic structural diagram of the wireless charging transmitting apparatus 211 in the wireless charging station 210. The wireless charging transmitting apparatus 211 includes a transmit conversion module 311, a power transmit coil 312, a transmit control module 313, a transmit communications module 314, an authentication management module 315, and a storage module 316, where the transmit conversion module 311 may be connected to a power source, and is configured to: obtain energy from the power source, and convert an alternating current or direct current power supply of the power source into a high-frequency alternating current. When the power source is an alternating current input end, the transmit conversion module 311 includes a power factor correction unit (not shown in FIG. 3) and an inverter unit (not shown in FIG. 3). When the power source is a direct current input end, the transmit conversion module 311 includes an inverter unit (not shown in FIG. 3) and a voltage conversion unit (not shown in FIG. 3).

The power factor correction unit is configured to ensure that a phase of an input current of the wireless charging system is consistent with a phase of a power grid voltage, reduce system harmonic content, and increase a power factor value, thereby reducing impact of the wireless charging system on a power grid and improving reliability. The power factor correction unit may further increase or decrease an output voltage of the power factor correction unit depending on a next-stage device requirement. The inverter unit may convert the voltage output by the power factor correction unit into a high-frequency alternating current voltage, and apply the high-frequency alternating current voltage to the power transmit coil. The high-frequency alternating current voltage can greatly improve transmission efficiency and increase a transmission distance. It should be noted that the power source may be a power source inside the wireless charging transmitting apparatus 211, or may be an external power source connected to the wireless charging transmitting apparatus 211.

The power transmit coil 312 is configured to convert the high-frequency alternating current into a resonance voltage and current by using a network constituted by components mainly including an inductor and a capacitor.

The transmit control module 313 is configured to: based on an actual requirement for wireless charging transmit power, control a voltage, a current, and a frequency that are output by the transmit conversion module, and control the voltage and a current of the high-frequency alternating current in the power transmit coil 312.

The transmit communications module 314 is configured to perform wireless communication between the wireless charging transmitting apparatus 211 and the wireless charging receiving apparatus 221, including communication of information such as power control information, fault protection information, power-on/power-off information, and mutual authentication information. The wireless charging transmitting apparatus 211 may receive attribute information, a charging request, and mutual authentication information of the electric automobile that are sent by the wireless charging receiving apparatus. In addition, the wireless charging transmitting apparatus 211 may further send wireless charging transmit control information, mutual authentication information, wireless charging historical data information, or the like to the wireless charging receiving apparatus 221. A manner of wireless communication between the wireless charging transmitting apparatus 211 and the wireless charging receiving apparatus 221 may include but is not limited to any one or a combination of the following: a Bluetooth (bluetooth) technology, a wireless fidelity (wireless-fidelity, WiFi) technology, a ZigBee (Zigbee)-based wireless communications technology, a radio frequency identification (radio frequency identification, RFID) technology, a long range (long range, Lora) wireless technology, and near field communication (near field communication, NFC). Further, the transmit communications module 314 may further communicate with an intelligent terminal of a user to which the electric automobile 220 belongs, so that the user of the electric automobile can perform remote authentication and user information transmission by using the intelligent terminal.

The authentication management module 315 is configured to perform mutual authentication and permission management on the wireless charging transmitting apparatus 211, and the wireless charging receiving apparatus 221 of the electric automobile 220 in the wireless charging system.

The storage module 316 is configured to store charging process data, mutual authentication data (for example, the mutual authentication information), and permission management data (for example, permission management information) of the wireless charging transmitting apparatus 211. The mutual authentication data and the permission management data may be set before delivery, or may be set by a user.

FIG. 3 (right) is a schematic structural diagram of the wireless charging receiving apparatus 221 in the electric automobile 220. The wireless charging receiving apparatus 221 includes a power receive coil 321, a receive control module 322, a receive conversion module 323, and a receive communications module 324.

Further, the receive conversion module 323 may further be connected to an energy storage management module 326 and an energy storage module 325, and charge the energy storage module 325 by using energy received by the receive conversion module 323, to further drive the electric automobile. It should be noted that the energy storage management module 326 and the energy storage module 325 may be located inside the wireless charging receiving apparatus 221, or may be located outside the wireless charging receiving apparatus 221. This is not specifically limited in this embodiment of this application.

The power receive coil 321 is configured to receive active power and reactive power transmitted by a transmit end. The power transmit coil 312 and the power receive coil 321 in the wireless charging system may be combined selectively. Common network structure combination forms include a series (series)-series type (namely, an S-S type), a parallel (parallel)-parallel type (namely, a P-P type), an S-P type, a P-S type, an LCL-LCL type (where L represents an inductor, and C represents a capacitor), and an LCL-P type. This is not specifically limited in this embodiment of this application. In addition, to implement a two-way charging function of the wireless charging system, both the wireless charging transmitting apparatus 211 and the wireless charging receiving apparatus 221 may further include a power receive coil and a power transmit coil. The power receive coil and the power transmit coil that are included in the wireless charging transmitting apparatus 211 or the wireless charging receiving apparatus 221 may be disposed separately or may be integrated.

The receive control module 322 is configured to control a voltage, a current, and a frequency of the receive conversion module 323 based on an actual requirement for wireless charging receive power.

The receive conversion module 323 is configured to convert a high-frequency resonance current and voltage received by the power receive coil into a direct current voltage and a direct current that are required for charging the energy storage module 325. The receive conversion module 323 usually includes a rectifier unit (not shown in FIG. 3) and a direct current conversion unit (not shown in FIG. 3). The rectifier unit is configured to convert the high-frequency resonance current and voltage received by the power receive coil into the direct current voltage and the direct current, and the conversion unit is configured to provide the direct current voltage for a next-stage charging circuit, to implement charging in a constant mode.

The receive communications module 324 is configured to perform wireless communication between the wireless charging transmitting apparatus 211 and the wireless charging receiving apparatus 221, including communication of information such as power control information, fault protection information, power-on/power-off information, and mutual authentication information.

Figure 4:
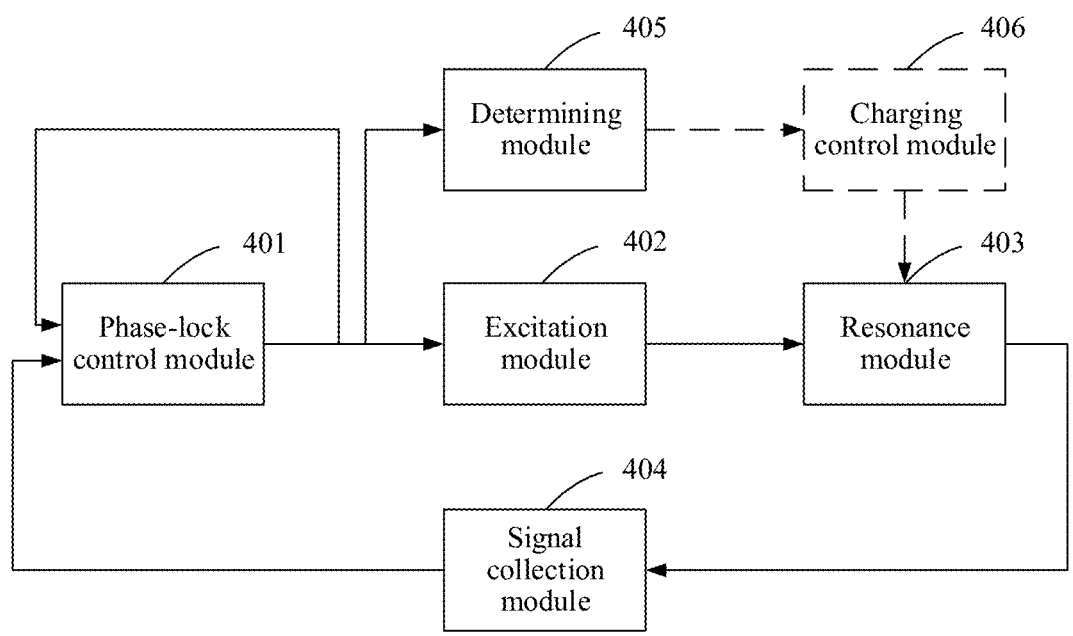
FIG. 4 shows an apparatus for detecting a metal foreign matter in a wireless charging system according to an embodiment of this application.

As shown in FIG. 4, an embodiment of this application provides an apparatus for detecting a metal foreign matter in a wireless charging system, where the apparatus is applicable to the wireless charging system shown in FIG. 1 to FIG. 3. The apparatus 400 includes a phase-lock control module 401, an excitation module 402, a resonance module 403, a signal collection module 404, and a determining module 405, where an output end of the phase-lock control module 401 is connected to all of a first input end of the phase-lock control module 401, an input end of the excitation module 402, and an input end of the determining module 405, a second input end of the phase-lock control module 401 is connected to an output end of the signal collection module 404, an input end of the signal collection module 404 is connected to an output end of the resonance module 403, and an input end of the resonance module 403 is connected to an output end of the excitation module 402;

the phase-lock control module 401 is configured to output a first signal to the excitation module 402, where the first signal is used to control a frequency of a second signal generated by the excitation module 402;

the excitation module 402 is configured to: generate the second signal based on the first signal, and output the second signal to the resonance module 403, where the frequency of the second signal is determined based on a frequency of the first signal, and the second signal is used to excite the resonance module 403;

the resonance module 403 includes at least one foreign-matter detection coil and at least one resonant capacitor, and is configured to generate a third signal under excitation of the second signal by using a resonant circuit including a target coil and a target capacitor, where the at least one foreign-matter detection coil is connected to the at least one resonant capacitor, the target coil is one or more of the at least one foreign-matter detection coil, the target capacitor is one or more of the at least one resonant capacitor, the at least one foreign-matter detection coil is distributed above a transmit coil of the wireless charger or a receive coil of the to-be-charged device, and an area of the at least one foreign-matter detection coil can cover an area of the transmit coil or an area of the receive coil;

the signal collection module 404 is configured to: collect the third signal, and output the third signal to the phase-lock control module 401;

the phase-lock control module 401 is further configured to adjust the frequency of the output first signal based on a difference between a phase of the first signal and a phase of the third signal, where a difference between a phase of the frequency-adjusted first signal and the phase of the third signal is less than a first specified value, and a frequency of the second signal that is generated by the excitation module 402 based on the frequency-adjusted first signal is the same as a resonance frequency of the resonant circuit; and the determining module 405 is configured to determine, based on the frequency-adjusted first signal and a pre-stored fourth signal, whether there is a metal foreign matter in an area of the target coil, or determine, based on the fourth signal and the difference between the phase of the first signal and the phase of the third signal, whether there is a metal foreign matter in the area of the target coil, where the fourth signal is a signal that is output by the resonant circuit in a resonant state when there is no metal foreign matter in the area of the target coil.

Figure 5:
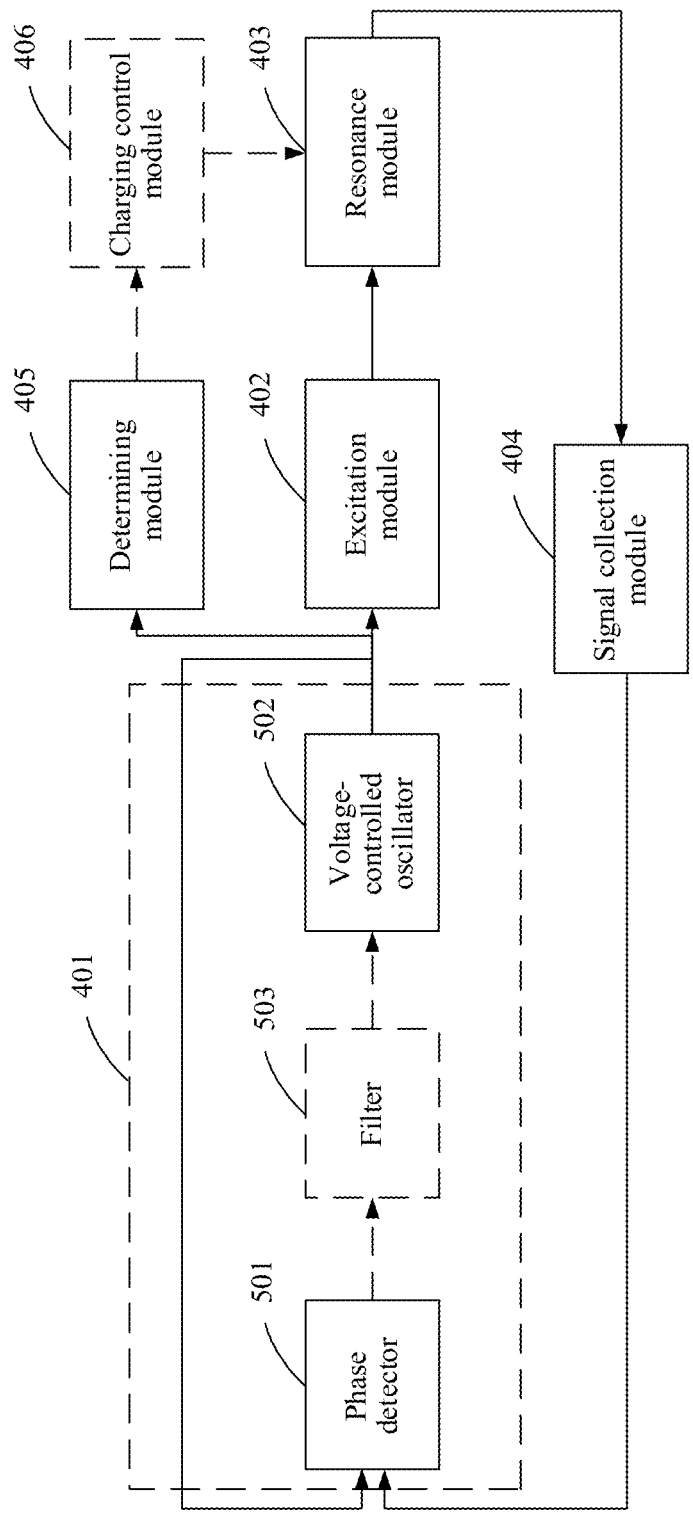
FIG. 5 is a schematic structural diagram of a first type of phase-lock control module according to an embodiment of this application.

In a possible implementation, the phase-lock control module 401 may be a phase-locked loop chip, or may be implemented by a combination of discrete devices or a combination of corresponding chips. When the phase-lock control module 401 is implemented by a combination of discrete devices or a combination of corresponding chips, the implementation may include but is not limited to any one of the following manners:

Manner 1: The phase-lock control module 401 includes a phase detector and a voltage-controlled oscillator. As shown in FIG. 5, an input end of the voltage-controlled oscillator 502 is connected to an output end of the phase detector 501, an output end of the voltage-controlled oscillator 502 is connected to all of a first input end of the phase detector 501, the input end of the determining module 405, and the input end of the excitation module 402, and a second input end of the phase detector 501 is connected to the output end of the signal collection module 404, where the phase detector 501 is configured to: generate a fifth signal based on the difference between the phase of the first signal and the phase of the third signal, and output the fifth signal to the voltage-controlled oscillator 502; and the voltage-controlled oscillator 502 is configured to generate the frequency-adjusted first signal based on the fifth signal.

In a possible implementation, when the phase-lock control module 401 is of the structure shown in FIG. 5, the determining module 405 is specifically configured to: when a difference between a frequency of the frequency-adjusted first signal and a frequency of the fourth signal is less than a second specified value, determine that there is no metal foreign matter in the area of the target coil; or when a difference between a frequency of the frequency-adjusted first signal and a frequency of the fourth signal is greater than or equal to the second specified value, determine that there is a metal foreign matter in the area of the target coil.

Figure 6:
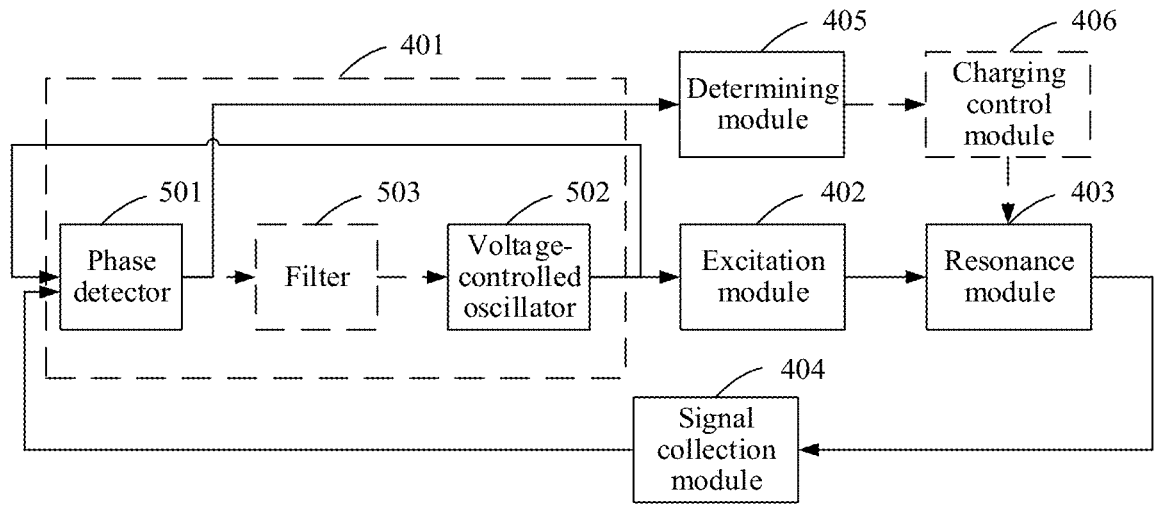
FIG. 6 is a schematic structural diagram of a second type of phase-lock control module according to an embodiment of this application.

Manner 2: The phase-lock control module 401 includes a phase detector and a voltage-controlled oscillator. As shown in FIG. 6, an output end of the voltage-controlled oscillator 502 is connected to both a first input end of the phase detector 501 and the input end of the excitation module 402, a second input end of the phase detector 501 is connected to the output end of the signal collection module 404, and an output end of the phase detector 501 is connected to both an input end of the voltage-controlled oscillator 502 and the input end of the determining module 405, where the phase detector 501 is configured to: generate a fifth signal based on the difference between the phase of the first signal and the phase of the third signal, and output the fifth signal to the voltage-controlled oscillator 502 and the determining module 405; and the voltage-controlled oscillator 502 is configured to generate the frequency-adjusted first signal based on the fifth signal.

In a possible implementation, when the phase-lock control module 401 is of the structure shown in FIG. 6, the determining module 405 is specifically configured to: when a difference between an amplitude of the fifth signal and an amplitude of the fourth signal is less than a second specified value, determine that there is no metal foreign matter in the area of the target coil; or when a difference between corresponding parameter values of the fifth signal and the fourth signal is greater than or equal to the second specified value, determine that there is a metal foreign matter in the area of the target coil.

In a possible implementation, the phase-lock control module 401 in Manner 1 or Manner 2 may further include a filter 503, as shown in FIG. 5 (or FIG. 6). An input end of the filter 503 is connected to the output end of the phase detector 501, and an output end of the filter 503 is connected to the input end of the voltage-controlled oscillator 502; and the filter 503 is configured to: filter out a harmonic component of the fifth signal, and output a filtered fifth signal to the voltage-controlled oscillator.

Figure 7:
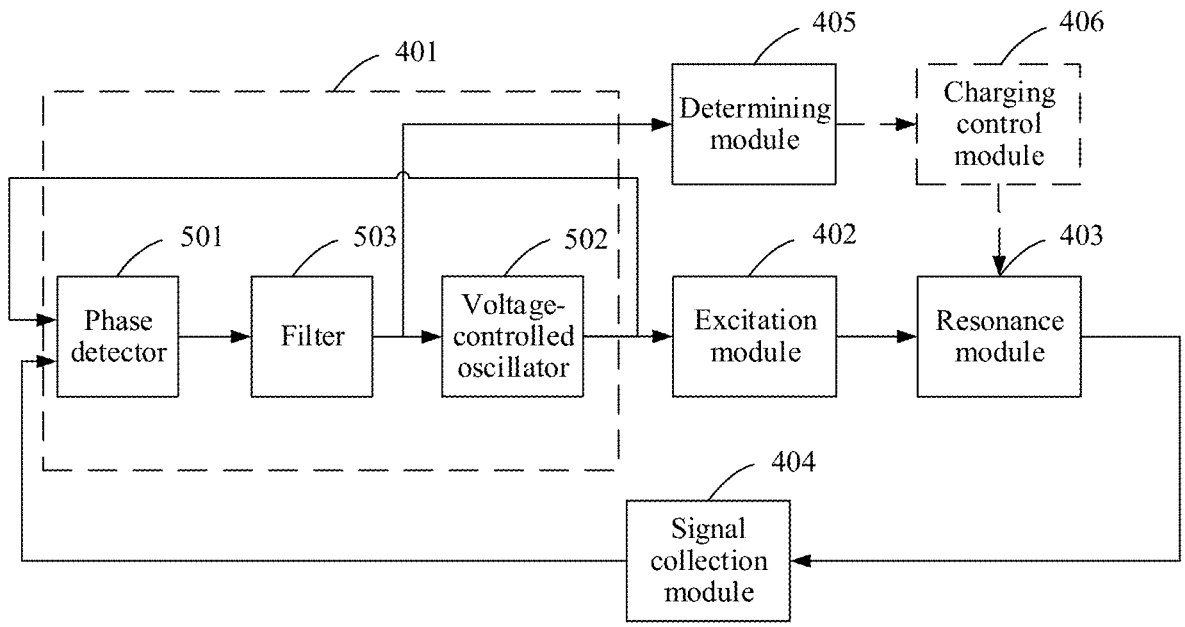
FIG. 7 is a schematic structural diagram of a third type of phase-lock control module according to an embodiment of this application.

Manner 3: The phase-lock control module 401 includes a phase detector, a filter, and a voltage-controlled oscillator. As shown in FIG. 7, an output end of the voltage-controlled oscillator 502 is connected to both a first input end of the phase detector 501 and the input end of the excitation module 402, a second input end of the phase detector 501 is connected to the output end of the signal collection module 404, an output end of the phase detector 501 is connected to an input end of the filter 503, and an output end of the filter 503 is connected to both an input end of the voltage-controlled oscillator 502 and the input end of the determining module 405, where the phase detector 501 is configured to: generate a fifth signal based on the difference between the phase of the first signal and the phase of the third signal, and output the fifth signal to the filter 503;

the filter 503 is configured to: filter out a harmonic component of the fifth signal, and output a filtered fifth signal to the voltage-controlled oscillator 502 and the determining module 405; and the voltage-controlled oscillator 502 is configured to generate the frequency-adjusted first signal based on the filtered fifth signal.

In a possible implementation, when the phase-lock control module 401 is of the structure shown in FIG. 7, the determining module 405 is specifically configured to: when a difference between an amplitude of the filtered fifth signal and an amplitude of the fourth signal is less than a second specified value, determine that there is no metal foreign matter in the area of the target coil; or when a difference between an amplitude of the filtered fifth signal and an amplitude of the fourth signal is greater than or equal to a second specified value, determine that there is a metal foreign matter in the area of the target coil.

Further, the phase detector 501 in Manner 1 to Manner 3 may be an analog phase detector or a digital phase detector. When a type of the fifth signal (a digital signal or an analog signal) output by the phase-lock control module 401 is different from a type of the fourth signal stored in the determining module 405, the apparatus 400 further includes a digital-to-analog conversion module or an analog-to-digital conversion module, so that the type of the fifth signal to be compared by the determining module 405 is the same as that of the fourth signal. For example, in Manner 1, when the phase detector 501 is a digital phase detector and the fourth signal stored in the determining module 405 is an analog signal, the apparatus 400 further includes a digital-to-analog conversion module, where an input end of the digital-to-analog conversion module is connected to the output end of the voltage-controlled oscillator 502, an output end of the digital-to-analog conversion module is connected to an output end of the determining module, and the digital-to-analog conversion module is configured to convert the first signal that is output by the voltage-controlled oscillator 502 into an analog signal. When the phase detector 501 is an analog phase detector and the fourth signal stored in the determining module 405 is a digital signal, the apparatus 400 further includes an analog-to-digital conversion module, where an input end of the analog-to-digital conversion module is connected to the output end of the voltage-controlled oscillator 502, an output end of the analog-to-digital conversion module is connected to an output end of the determining module, and the analog-to-digital conversion module is configured to convert the first signal that is output by the voltage-controlled oscillator 502 into a digital signal.

It should be noted that specific implementations of the phase detector 501, the digital-to-analog conversion module, and the analog-to-digital conversion module are not limited in this embodiment of this application. The phase detector 501, the digital-to-analog conversion module, and the analog-to-digital conversion module may be circuits including discrete devices, or may be integrated chips or the like.

In Manner 1 to Manner 3, the voltage-controlled oscillator 502 is configured to convert the fifth signal that is output by the phase detector 501 and that represents the difference between the phase of the first signal and the phase of the third signal into a frequency signal, that is, the first signal. The first signal may be a square wave signal with a variable frequency. A pulse width of the square wave signal with a variable frequency may be fixed or variable.

In Manner 1 to Manner 3, the filter 503 is mainly configured to filter out a noise signal in the fifth signal, where the noise signal includes a high frequency component and/or a low frequency component, to improve control precision of the phase-lock control module 401. It should be noted that a specific implementation of the filter 503 is not limited in this embodiment of this application. All integrated chips, chips carrying a corresponding filtering software program, or circuits (active power filters or passive power filters) including discrete devices (for example, a capacitor, an inductor, and a resistor) that can implement the filtering function are applicable to this embodiment of this application.

Figure 8:
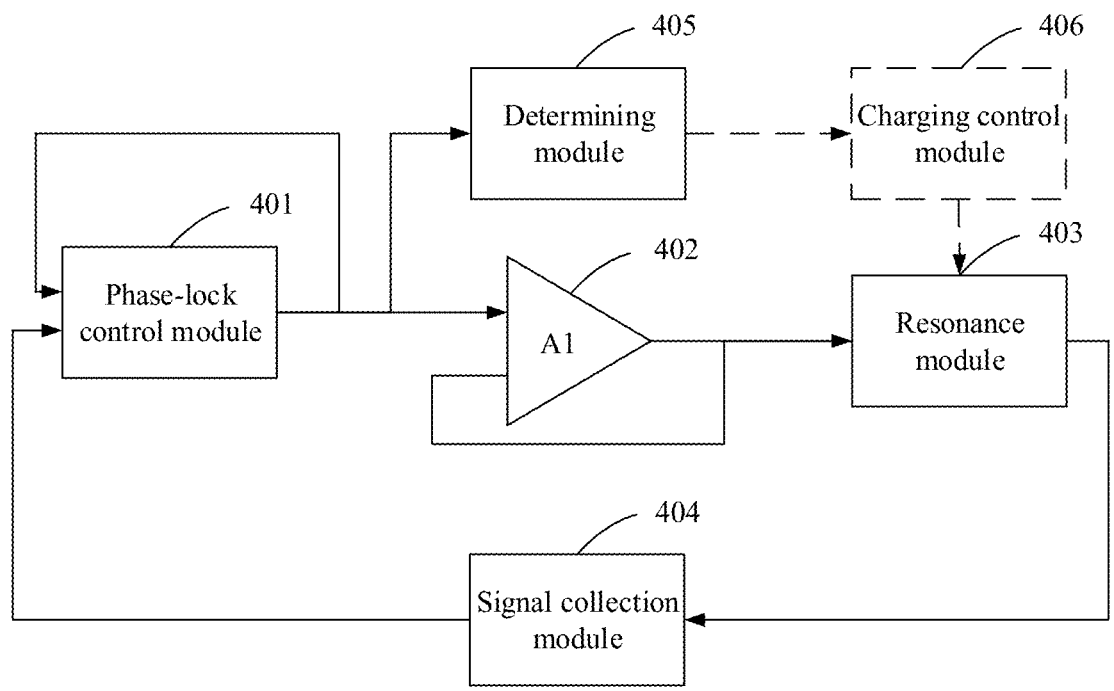
FIG. 8 is a schematic structural diagram of a first type of excitation module according to an embodiment of this application.

In a possible implementation, the excitation module 402 may be implemented, for example, in either of the following two manners:

Manner A: The excitation module 402 may be a first power amplifier A1. As shown in FIG. 8, an output end of the first power amplifier A1 is connected to both a first input end of the first power amplifier A1 and the input end of the resonance module 403, and a second input end of the first power amplifier A1 is connected to the output end of the phase-lock control module 401.

Manner B: The excitation module 402 may be a voltage-type converter or a current-type converter. The voltage-type converter and the current-type converter each may be a half bridge converter, a full bridge converter, or another circuit structure. When the third signal that is output by the excitation module 402 cannot drive the voltage-type converter and the current-type converter, the excitation module 402 may further include a second power amplifier. An output end of the second power amplifier is connected to both a first output end of the second power amplifier and an input end of the voltage-type converter (or the current-type converter), and an output end of the voltage-type converter (or the current-type converter) is connected to the input end of the resonance module 403.

Figure 9:
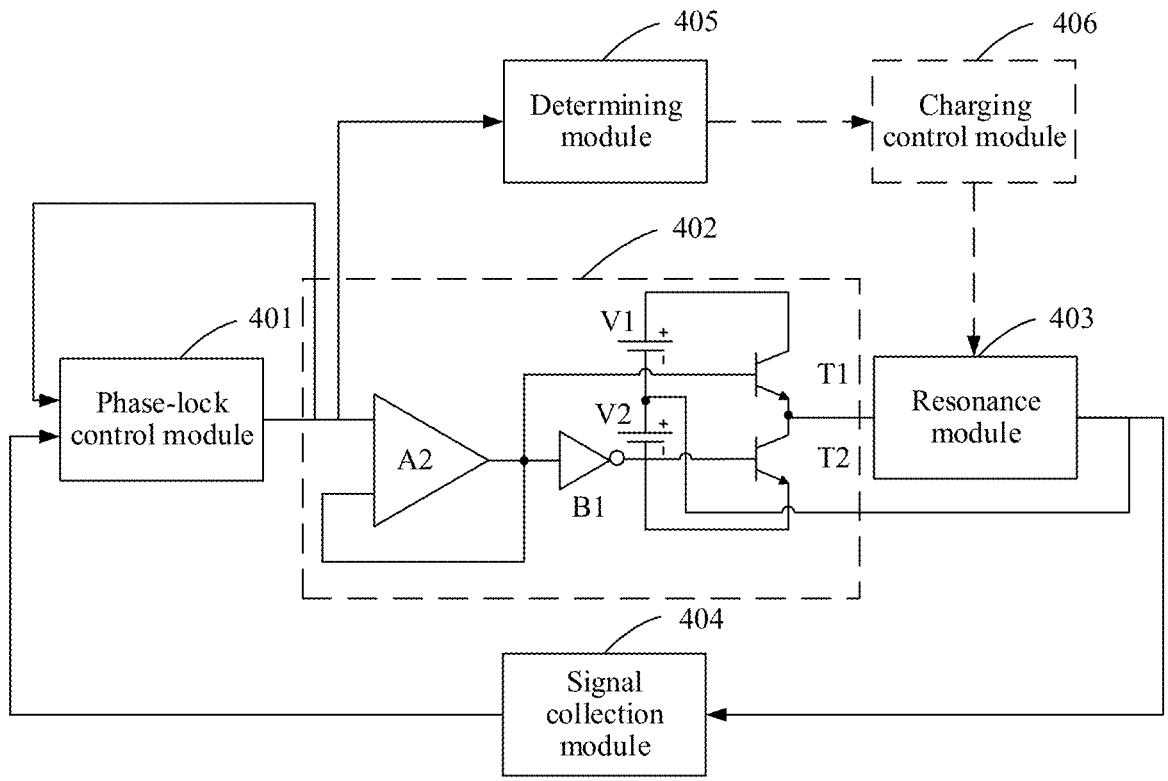
FIG. 9 is a schematic structural diagram of a second type of excitation module according to an embodiment of this application.

For example, when the excitation module 402 is a half bridge voltage-type converter, a structure of the apparatus 400 is shown in FIG. 9. The excitation module 402 includes a second power amplifier A2, a transistor T1, a transistor T2, a phase inverter B1, a first voltage source V1, and a second voltage source V2. An output end of the second power amplifier A2 is connected to all of a first input end of the second power amplifier, a base of the transistor T1, and an input end of the phase inverter B1; a second input end of the second power amplifier is connected to the output end of the phase-lock control module 401; an output end of the phase inverter is connected to a base of the transistor T2; a positive electrode of the first voltage source V1 is connected to a collector of the first transistor T1; a negative electrode of the second voltage source V2 is connected to an emitter of the second transistor T2; an emitter of the transistor T1 is connected to both a collector of the second transistor and the input end of the resonance module 403; and a negative electrode of the first voltage source V1 is connected to both a positive electrode of the second voltage source V2 and the output end of the resonance module 403.

Figure 10:
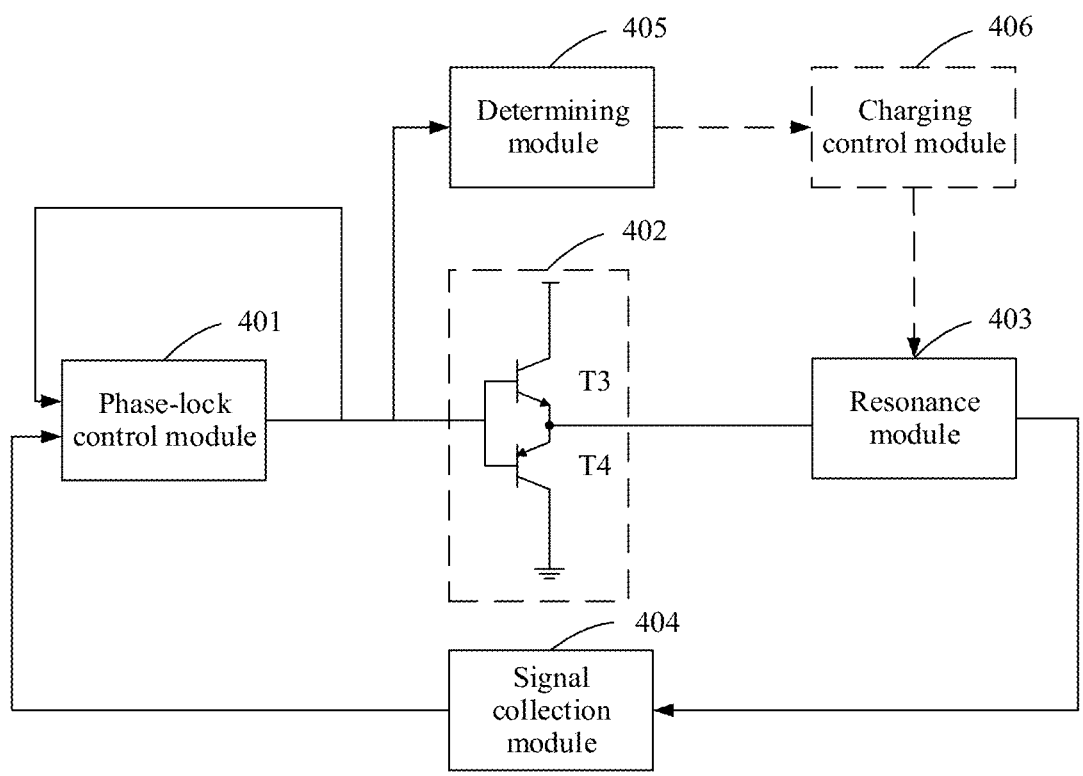
FIG. 10 is a schematic structural diagram of a third type of excitation module according to an embodiment of this application.

Manner C: The excitation module 402 may be an amplification circuit including components such as transistors. For example, the excitation module 402 shown in FIG. 10 is a push-pull circuit including a transistor T3 (an NPN transistor) and a transistor T4 (a PNP transistor). A collector of the transistor T3 is connected to a power source Vs, and an emitter of the transistor T3 is connected to an emitter of the transistor T4. A base of the transistor T3 is the input end of the excitation module 402, and the emitter of the transistor T4 is the output end of the excitation module 402.

In a possible implementation, the resonance module 403 may include one foreign-matter detection coil, where the foreign-matter detection coil is distributed above the transmit coil of the wireless charger or the receive coil of the to-be-charged device, and an area of the foreign-matter detection coil can cover the area of the transmit coil or the area of the receive coil. Alternatively, the resonance module 403 may include a foreign-matter detection coil array including a plurality of foreign-matter detection coils, where the foreign-matter detection coil array is distributed above the transmit coil of the wireless charger or the receive coil of the to-be-charged device, and an area of the foreign-matter detection coil array can cover the area of the transmit coil or the area of the receive coil.

Generally, when the wireless charging system works, the to-be-charged device is located above the wireless charger, and a probability that there is a metal foreign matter on a surface of the transmit coil of the wireless charger is relatively high. Therefore, the foreign-matter detection coil (array) is usually arranged on the surface of the transmit coil of the wireless charger.

When a metal foreign matter is relatively small and the transmit coil of the wireless charger or the receive coil of the to-be-charged device is relatively large, if only one foreign-matter detection coil is used, the third signal that is output by the resonance module 403 is relatively weak, that is, sensitivity of metal foreign matter detection is relatively low. For example, a size of a transmit coil of a wireless charger is at least 20 cm×20 cm, and one foreign-matter detection coil whose size is equivalent to that of the transmit coil is separately used for detection, but a metal foreign matter is only the same as a 5-jiao coin or a 1-jiao coin in size. Therefore, to make, as far as possible, whether there is a metal foreign matter detectable at any location of the transmit coil or the receive coil by using the foreign-matter detection coil, a foreign-matter detection coil array including a plurality of foreign-matter detection coils is usually used in a specific implementation process. It should be noted that an arrangement method of the foreign-matter detection coil array, sizes of the foreign-matter detection coils, and shapes of the foreign-matter detection coils are not limited in this embodiment of this application. A shape of each foreign-matter detection coil may be a circle, a rectangle, a square, or another shape. The foreign-matter detection coils in the foreign-matter detection coil array may be evenly distributed above the transmit coil or the receive coil. Alternatively, more foreign-matter detection coils may be arranged in an area of the transmit coil or an area of the receive coil on which relatively great impact is exerted (or an area in which a metal foreign matter appears at a relatively high probability), fewer foreign-matter detection coils may be arranged in an area of the transmit coil or an area of the receive coil on which relatively small impact is exerted (or an area in which a metal foreign matter appears at a relatively low probability).

The smaller sizes of the foreign-matter detection coils in the foreign-matter detection coil array indicate a smaller area of the transmit coil or a smaller area of the receive coil that can be detected by the apparatus 400 each time, and therefore a metal foreign matter can be positioned more precisely. However, the smaller sizes of the foreign-matter detection coils in the foreign-matter detection coil array indicate a larger quantity of foreign-matter detection coils arranged on the transmit coil or the receive coil. This affects foreign-matter detection efficiency. Therefore, the sizes and a quantity of the foreign-matter detection coils in the foreign-matter detection coil array need to be determined depending on an actual application scenario and a detection target, to balance precision and efficiency of metal foreign matter detection.

Figure 11A:
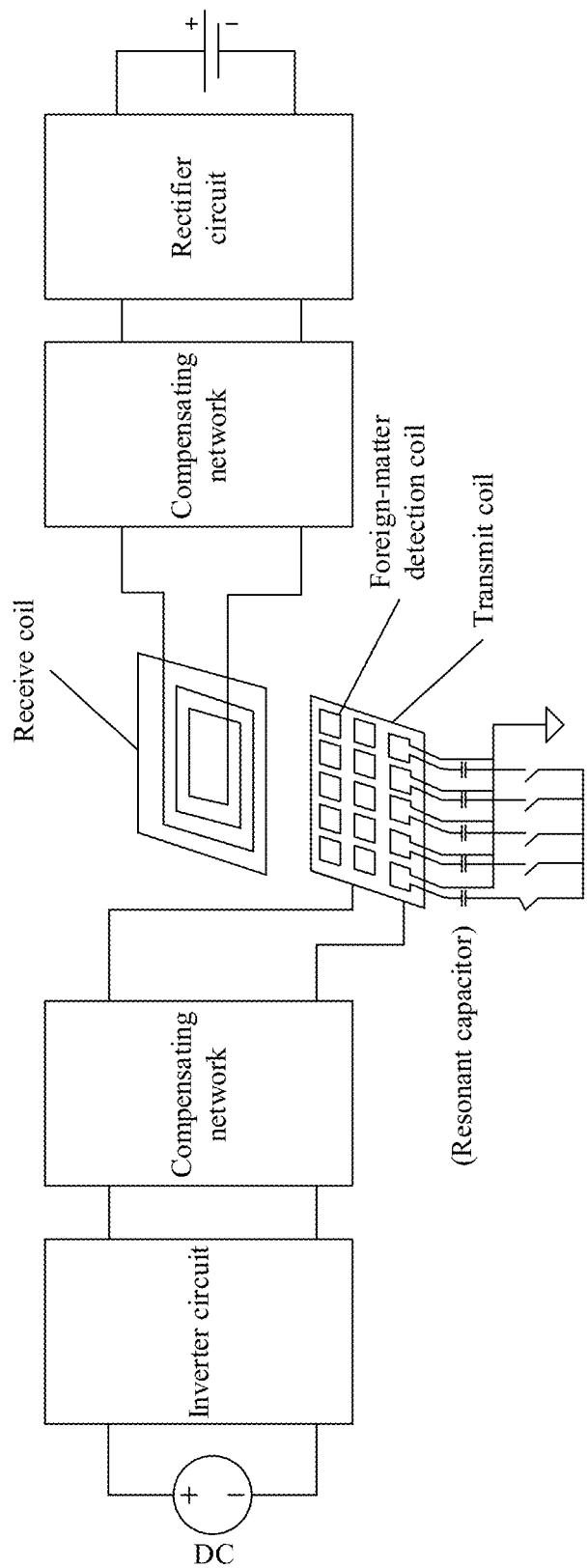
FIG. 11a is a schematic distribution diagram of a foreign-matter detection coil according to an embodiment of this application.

For example, as shown in FIG. 11a, the foreign-matter detection coil array is distributed on the surface of the transmit coil, where the largest rectangle represents the transmit coil, small rectangles represent foreign-matter detection coils, and the foreign-matter detection coils are evenly distributed on the transmit coil. Theoretically, the foreign-matter detection coils need to fully cover the transmit coil (in actual application, an interval between adjacent foreign-matter detection coils is reduced to increase an area of the transmit coil covered by the foreign-matter detection coil array). To clearly illustrate the transmit coil, the foreign-matter detection coils, and a relationship between the foreign-matter detection coils, the transmit coil in FIG. 11a is slightly larger than a coverage area of the foreign-matter detection coil array. In addition, specific intervals are reserved between the foreign-matter detection coils.

In this case, a working principle of the apparatus for detecting a metal foreign matter in the wireless charging system provided in this embodiment of this application is as follows. The determining module 405 pre-stores voltage values (that is, the fourth signal) that are output by a resonant circuit including the foreign-matter detection coils at different locations on the transmit coil and the resonant capacitor and that are present when there is no metal foreign matter on the transmit coil. The voltage values that are output by the resonant circuit including the foreign-matter detection coils at the different locations on the transmit coil and the resonant capacitor are V (X, Y)=U. X indicates a location of each foreign-matter detection coil in a horizontal coordinate X direction, and Y indicates a location of each foreign-matter detection coil in a vertical coordinate Y direction. For example, V (1, 1) indicates a voltage at the first foreign-matter detection coil in the X direction and the Y direction.

Figure 11B:
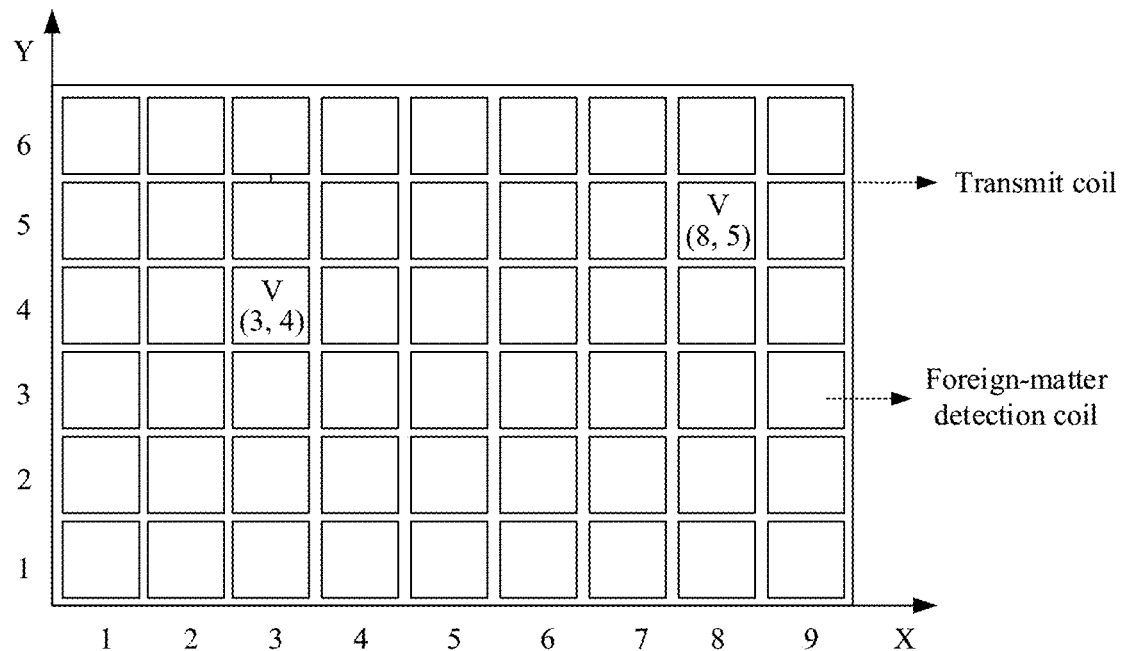
FIG. 11b is a schematic distribution diagram of a foreign-matter detection coil according to an embodiment of this application.
Figure 12:
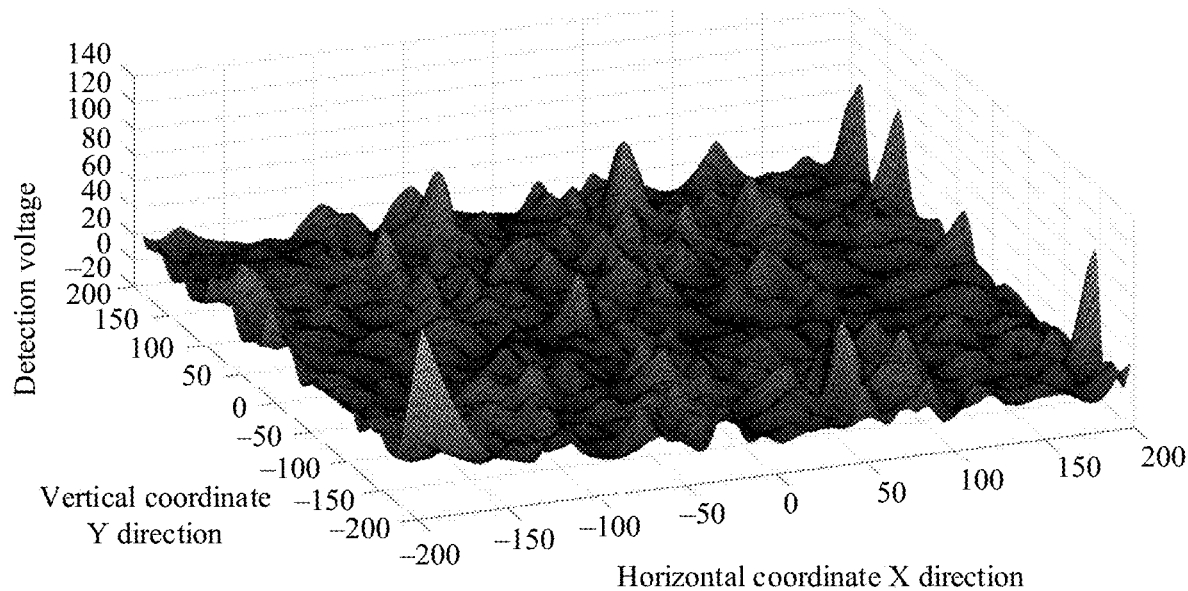
FIG. 12 shows a detection result of a foreign-matter detection coil when there is no metal foreign matter according to an embodiment of this application.

When there is no metal foreign matter on the transmit coil, the excitation module 402 sequentially outputs excitation signals that enable resonances to occur in the resonant circuit including the foreign-matter detection coils in the foreign-matter detection coil array and the at least one resonant capacitor. Voltage values of the foreign-matter detection coils when the resonance occurs are sequentially measured, where X ranges from 1 to 9, and Y ranges from 1 to 6; and then, the voltage values are stored to a memory. For example, for V (3, 4) and V (8, 5) shown in FIG. 11b, V (3, 4) is corresponding to an induced voltage value of the third foreign-matter detection coil in the X direction and the fourth foreign-matter detection coil in the Y direction, and V (8, 5) is corresponding to an induced voltage value of the eighth foreign-matter detection coil in the X direction and the fifth foreign-matter detection coil in the Y direction. Each foreign-matter detection coil is corresponding to one induced voltage value, and then a three-dimensional view shown in FIG. 12 can further be obtained. When there is no metal foreign matter on the transmit coil, a voltage value of each foreign-matter detection coil is less than a threshold. When there is a metal foreign matter on the transmit coil, it can be detected that a voltage value corresponding to a foreign-matter detection coil having the metal foreign matter is greater than a voltage value detected when there is no metal foreign matter. Detected voltage values of the foreign-matter detection coils at different locations are compared with corresponding voltage values detected when there is no metal foreign matter, and whether a difference between the voltages exceeds the second specified value is determined, to determine whether there is a metal foreign matter on the transmit coil. If the difference between the voltages exceeds the second specified value, it is considered that there is a metal foreign matter in an area of the foreign-matter detection coil (the area of the transmit coil covered by the foreign-matter detection coil).

Figure 13:
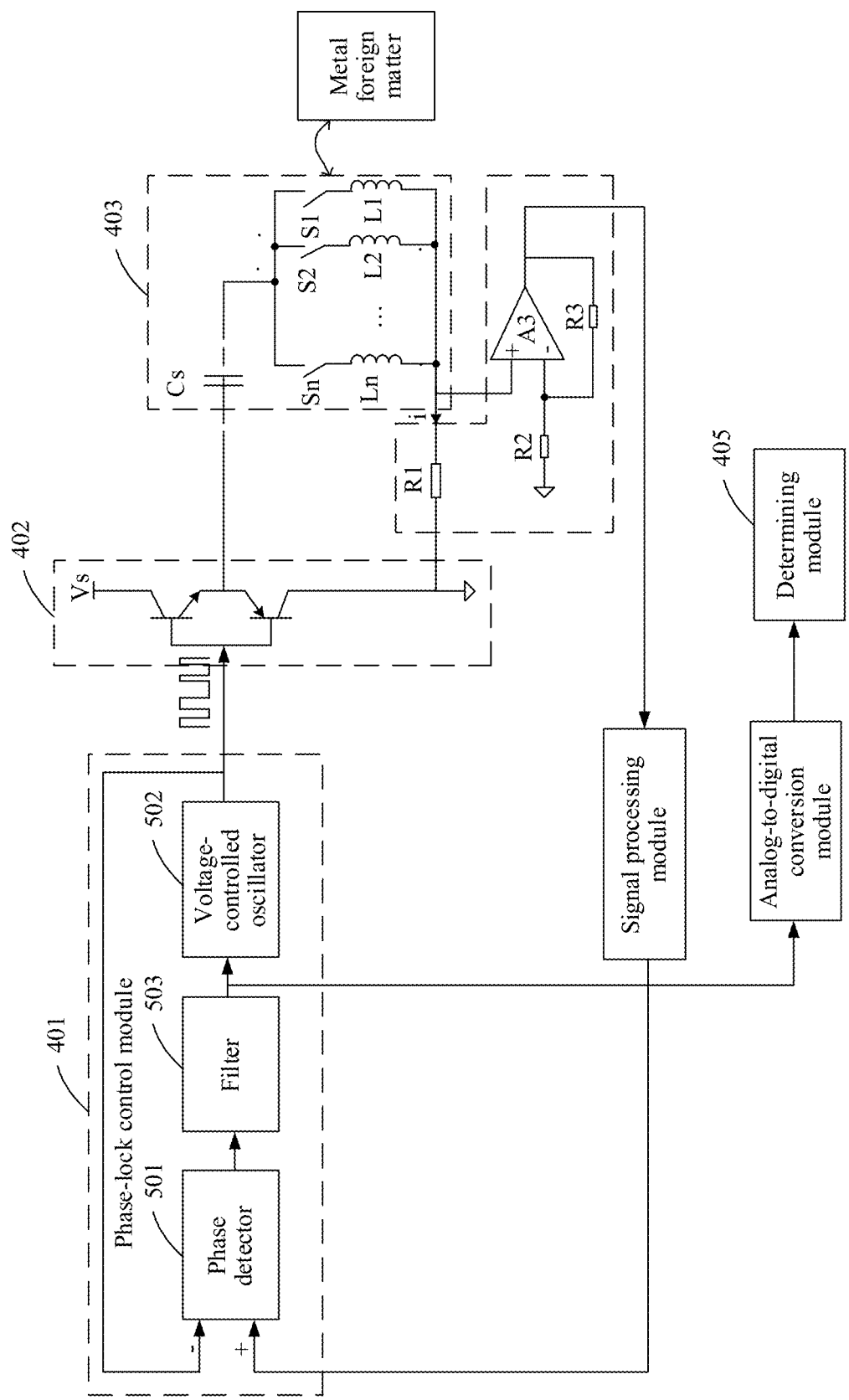
FIG. 13 is a schematic structural diagram of an excitation module according to an embodiment of this application.

In a possible implementation, the resonance module 403 further includes at least one switch, and the at least one foreign-matter detection coil and the at least one resonant capacitor are connected in parallel and/or in series through the at least one switch. For example, FIG. 13 shows the resonance module 403. The resonance module 403 includes n foreign-matter detection coils L1, L2, . . . , and Ln and n switches S1, S2, . . . , and Sn, and then foreign-matter detection coils are connected in parallel respectively through the switches S1, S2, . . . , and Sn. When the switch S1 is closed, and S2, S3, . . . , and Sn are open, the foreign-matter detection coil L1 (that is, the target coil) and a resonant capacitor Cs (that is, the target capacitor) form a resonant circuit. The excitation module 402 applies an alternating current voltage with a frequency of ω and an amplitude of V to the resonant circuit. When there is no metal foreign matter in an area of the foreign-matter detection coil L1, an equivalent impedance of the resonant circuit is $$j\omega L1 - \frac{1}{j\omega Cs}.$$

When there is a metal foreign matter in an area of the foreign-matter detection coil L1, because electromagnetic induction causes an inductance of the foreign-matter detection coil L1 to change to L1+ΔL (ΔL is an inductance variation caused by the metal foreign matter on the foreign-matter detection coil L1), an equivalent impedance of the resonant circuit becomes $$j\omega(L1 + \Delta L) - \frac{1}{j\omega Cs}.$$

A change of the impedance of the resonant circuit changes a current of the resonant circuit. Then, the determining module 405 may compare a current (that is, the fourth signal) of the resonant circuit when there is no metal foreign matter in the area of the foreign-matter detection coil L1 with a current (that is, the third signal) that is detected currently when a resonance occurs in the resonant circuit, to determine whether there is a metal foreign matter in the area of the foreign-matter detection coil L1. By analogy, by controlling statuses of the n switches, the transmit coil or the receive coil covered by the n foreign-matter detection coils can be detected.

Figure 14:
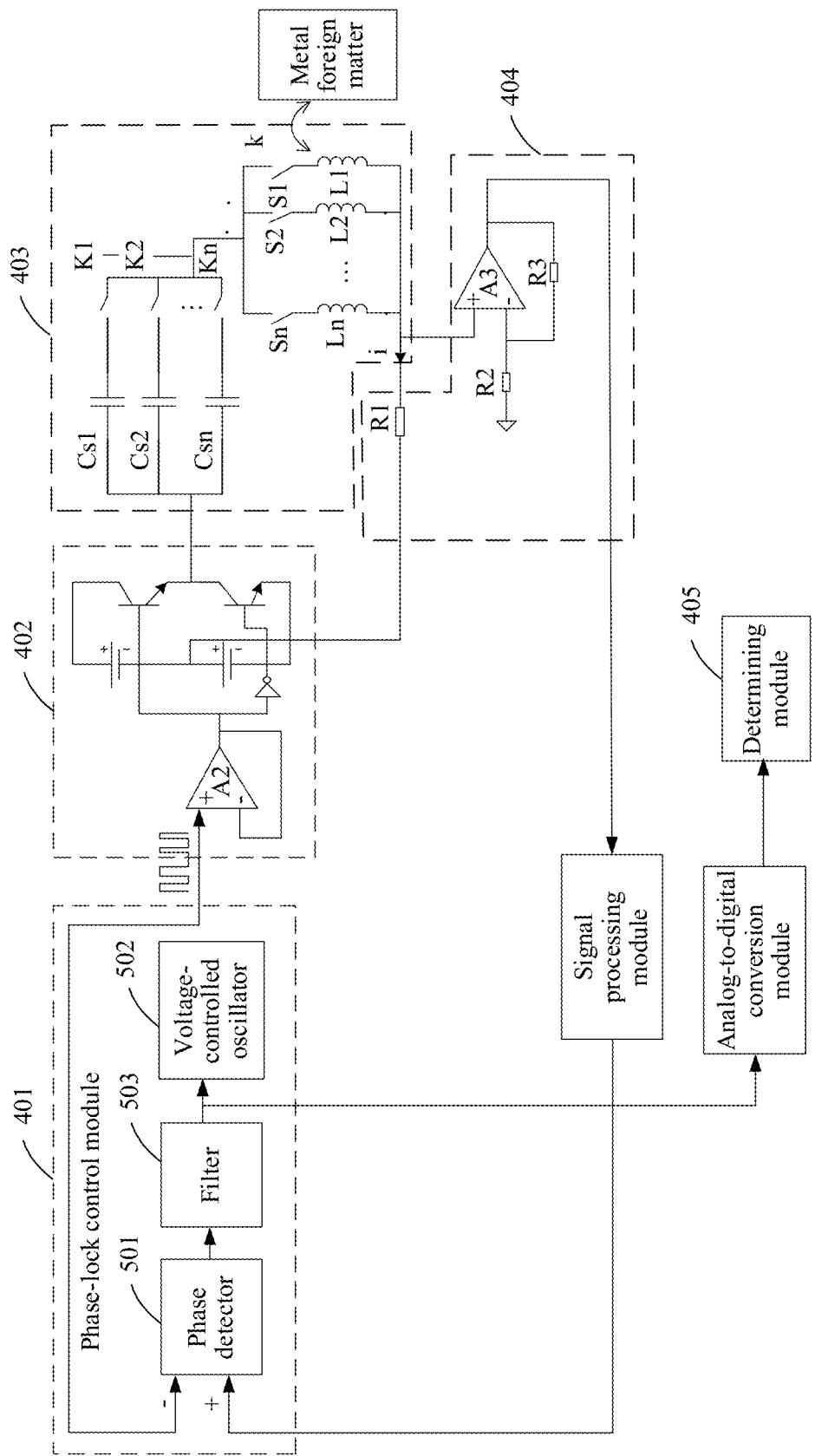
FIG. 14 is a schematic structural diagram of another excitation module according to an embodiment of this application.

In a possible implementation, to detect a plurality of types of metal foreign matters made of different materials and further improve accuracy of a detection result, the resonance module 403 includes a plurality of resonant capacitors. The plurality of resonant capacitors are connected to the at least one foreign-matter detection coil through the at least one switch, so that one target coil and capacitors with different capacitances may form a resonant circuit with different resonance frequencies, thereby implementing detection of metal foreign matters made of different materials. For example, as shown in FIG. 14, the resonance module 403 includes n resonant capacitors C1, C2, . . . , and Cn, n foreign-matter detection coils L1, L2, . . . , and Ln, n switches K1, K2, . . . , and Kn, and n switches S1, S2, . . . , and Sn. The n resonant capacitors are connected in parallel through the switches K1, K2, . . . , and Kn, and the n foreign-matter detection coils are connected in parallel through the switches S1, S2, . . . , and Sn. When the switch S1 is closed, and S2, S3 . . . , and Sn are open, the switches K1, K2, . . . , and Kn are controlled, so that the foreign-matter detection coil L1 and resonant capacitors with different capacitances can form an LC series resonant circuit.

Figure 15:
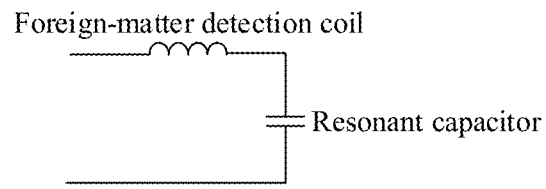
FIG. 15 is a schematic structural diagram of an LC series resonant circuit according to an embodiment of this application.
Figure 16:
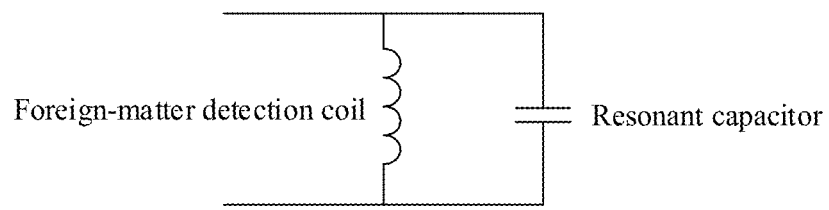
FIG. 16 is a schematic structural diagram of an LC parallel resonant circuit according to an embodiment of this application.
Figure 17:
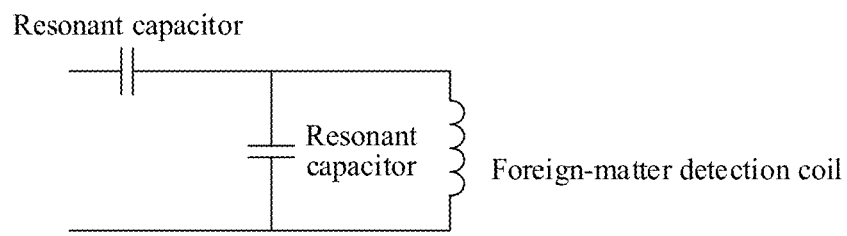
FIG. 17 is a schematic structural diagram of an LCC resonant circuit according to an embodiment of this application.
Figure 18:
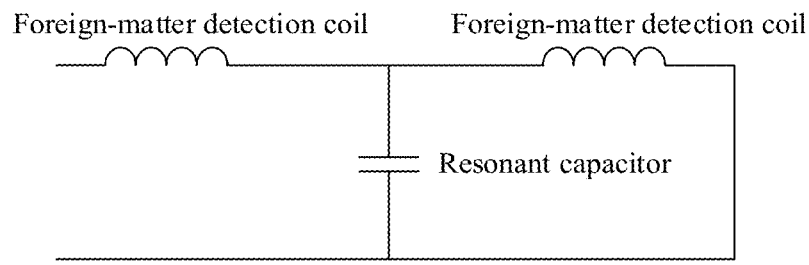
FIG. 18 is a schematic structural diagram of an LCL resonant circuit according to an embodiment of this application.

Further, the target coil and the target capacitor in the resonance module 403 may form an LC series resonant circuit, as shown in FIG. 15; the target coil and the target capacitor may form an LC parallel resonant circuit, as shown in FIG. 16; the target coil and the target capacitor may form an LCC resonant circuit, as shown in FIG. 17; or the resonance module 403 further includes at least one resonant inductor, and the target coil, the target capacitor, and the at least one resonant inductor may form an LCL resonant circuit, as shown in FIG. 18. The target coil may be one or more foreign-matter detection coils selected from the at least one foreign-matter detection coil in the resonance module 403 by using the at least one switch in the resonance module 403. The plurality of selected foreign-matter detection coils may be connected in parallel, connected in series, or connected in series and in parallel. The target capacitor may be one or more capacitors selected from the at least one resonant capacitor in the resonance module 403 by using the at least one switch in the resonance module 403. The plurality of selected capacitors may be connected in parallel, connected in series, or connected in series and in parallel.

In a possible implementation, the apparatus 400 may further include a charging control module 406. The charging control module 406 is connected to all of the at least one switch, the output end of the determining module 405, and the transmit coil, and is configured to: control a status of the at least one switch, and control a working status of the transmit coil based on a determining result of the determining module 405; or the charging control module 406 is connected to all of the at least one switch, the output end of the determining module 405, and the receive coil, and is configured to: control a status of the at least one switch, and control a working status of the receive coil based on a determining result of the determining module.

In a possible implementation, the signal collection module 404 may be a current collection circuit or a voltage collection circuit, for example, a sampling circuit or a Hall effect sensor including a resistor and a power amplifier. Whether the signal collection module 404 is a current collection circuit or a voltage collection circuit is determined based on a type of the resonant circuit that is in the resonance module 403 and that includes the target coil and the target capacitor. For example, when the resonant circuit that is in the resonance module 403 and that includes the target coil and the target capacitor is an LC series resonant circuit, the signal collection module 404 is usually a current collection circuit. When the resonant circuit that is in the resonance module 403 and that includes the target coil and the target capacitor is an LC parallel resonant circuit, the signal collection module 404 is usually a voltage collection circuit.

For example, as shown in FIG. 13 or FIG. 14, the signal collection module 404 includes a first resistor R1, a second resistor R2, a third resistor R3, and a third power amplifier A3. A first input end of the third power amplifier A3 is connected to both an end of the first resistor R1 and the output end of the resonance module 403, a second input end of the third power amplifier A3 is connected to both an end of the second resistor R2 and an end of the third resistor R3, an output end of the third power amplifier A3 is connected to both the other end of the third resistor R3 and the second input end of the phase-lock control module 401, and the other end of the first resistor R1 and the other end of the second resistor R2 are grounded. That the excitation module 402 is a push-pull circuit is used as an example in FIG. 18. The foreign-matter detection coils (L1-Ln) in the resonance module 403 are connected in parallel respectively through the corresponding switches (S1-Sn), and the resonant capacitor Cs is connected in series to the foreign-matter detection coils.

In a possible implementation, the apparatus 400 may further include a signal processing module. An input end of the signal processing module is connected to the output end of the signal collection module 404, and an output end of the signal processing module is connected to the second input end of the phase-lock control module 401; and when the first signal that is output by the phase-lock control module 401 is a digital signal, the signal processing module is configured to: convert the third signal into a digital signal, and output the digital signal corresponding to the third signal to the second input end of the phase-lock control module.

Further, the signal processing module may be a zero-crossing detection circuit. The zero-crossing detection circuit is configured to generate and output a square wave signal corresponding to the third signal, based on the third signal that is output by the resonance module. A point with an amplitude 0 in the square wave signal corresponding to the third signal is the same as a point with an amplitude 0 in the third signal. Alternatively, the signal processing module may be an analog-to-digital conversion module, configured to convert the third signal into a digital signal.

According to the apparatus for detecting a metal foreign matter in the wireless charging system provided in this embodiment of this application, the apparatus can control, by using the first signal that is output by the phase-lock control module 401, the frequency of the second signal that is output by the excitation module 402 and that is used to excite the resonance module 403; and the phase-lock control module 401 can adjust the frequency of the first signal that is output by the phase-lock control module 401, based on the third signal that is generated by the resonance module 403 and that is collected by the signal collection module 404 and the first signal that is output by the phase-lock control module 401. Because the difference between the phase of the adjusted first signal and the phase of the third signal is less than the first specified value, the frequency of the second signal that is output by the excitation module 402 reaches the resonance frequency of the resonant circuit that is in the resonance module 403 and that includes the target coil and the target resonant capacitor, and then a resonance occurs. In this case, the determining module 405 may determine, based on the frequency-adjusted first signal and the pre-stored fourth signal, whether there is a metal foreign matter in the area of the target coil, or determine, based on the difference between the phase of the first signal and the phase of the third signal and the fourth signal, whether there is a metal foreign matter in the area of the target coil.

In other words, through closed-loop control of the phase-lock control module 401, the apparatus for detecting a metal foreign matter in the wireless charging system provided in this embodiment of this application can make the second signal that is output by the excitation module 402 excite the resonant circuit that is in the resonance module 403 and that includes the target coil and the target capacitor, to cause a resonance. In this way, frequency sweeping excitation, complex computation and analysis, and a large amount of data processing do not need to be performed to obtain the resonance frequency of the resonant circuit including the foreign-matter detection coil, to make a resonance occur in the resonant circuit. In comparison with the prior art, control precision is higher and a computation amount is smaller in this embodiment of this application. This can effectively simplify a metal foreign matter detection process in the wireless charging system.

Based on the apparatus 400 for detecting a metal foreign matter in a wireless charging system provided in the foregoing embodiments, this application further provides a method for detecting a metal foreign matter in a wireless charging system. The method mainly includes the following steps.

(1) The phase-lock control module 401 outputs a first signal to the excitation module, where the first signal is used to control a frequency of a second signal generated by the excitation module.

The first signal that is output by the phase-lock control module 401 for the first time is generated by the phase-lock control module 401. Specifically, the first signal that is output by the phase-lock control module 401 for the first time may be generated by the phase-lock control module 401 based on a signal generated by a crystal oscillator of the phase-lock control module 401.

A frequency of the first signal that is output by the phase-lock control module 401 for the first time may be a frequency at which the resonant circuit including the target coil and the target capacitor encounters a resonance when a metal foreign matter whose occurrence probability is relatively high (a metal foreign matter that frequently exists) exists on the transmit coil of the wireless charger or the receive coil of the to-be-charged device. Therefore, the resonant circuit including the target coil and the capacitor can quickly reach a resonance state. This improves metal-foreign-matter detection efficiency.

(2) The excitation module 402 generates the second signal based on the first signal, and outputs the second signal to the resonance module, where the frequency of the second signal is determined based on the frequency of the first signal, and the second signal is used to excite the resonance module.

(3) The resonant circuit including the target coil and the target capacitor in the resonance module generates a third signal under excitation of the second signal.

(4) The signal collection module 404 collects the third signal, and outputs the collected third signal to the phase-lock control module.

(5) The phase-lock control module 401 adjusts the frequency of the output first signal based on a difference between a phase of the first signal and a phase of the third signal, where a difference between a phase of the frequency-adjusted first signal and the phase of the third signal is less than a first specified value, and a frequency of the second signal that is generated by the excitation module based on the frequency-adjusted first signal is the same as a resonance frequency of the resonant circuit.

(6) The determining module 405 determines, based on the frequency-adjusted first signal and a pre-stored fourth signal, whether there is a metal foreign matter in an area of the target coil, or determines, based on the fourth signal and the difference between the phase of the first signal and the phase of the third signal, whether there is a metal foreign matter in an area of the target coil, where the fourth signal is a signal that is output by the resonant circuit in a resonant state when there is no metal foreign matter in the area of the target coil.

In a possible implementation, the apparatus 400 further includes a signal processing module. An input end of the signal processing module is connected to the output end of the signal collection module, and an output end of the signal processing module is connected to the second input end of the phase-lock control module. When the first signal that is output by the phase-lock control module is a digital signal, the signal processing module converts the third signal into a digital signal, and outputs the digital signal corresponding to the third signal to the phase-lock control module.

In a possible implementation, the determining module 405 may use the following method to determine whether there is a metal foreign matter in the area of the target coil: when a difference between a frequency of the frequency-adjusted first signal and a frequency of the fourth signal is less than a second specified value, determining, by the determining module 405, that there is no metal foreign matter in the area of the target coil; or when a difference between a frequency of the frequency-adjusted first signal and a frequency of the fourth signal is greater than or equal to the second specified value, determining, by the determining module 405, that there is a metal foreign matter in the area of the target coil.

In a possible implementation, the phase-lock control module 401 adjusts the frequency of the output first signal according to the following steps: generating, by the phase-lock control module 401, a fifth signal based on the difference between the phase of the first signal and the phase of the third signal, and generating the frequency-adjusted first signal based on the fifth signal.

In a possible implementation, after the generating, by the phase-lock control module 401, a fifth signal based on the difference between the phase of the first signal and the phase of the third signal, and before the generating the frequency-adjusted first signal based on the fifth signal, the phase-lock control module 401 may further filter out a harmonic component of the fifth signal, and generate the frequency-adjusted first signal based on the filtered fifth signal. This improves control precision of the phase-lock control module 401.

In a possible implementation, the determining module 405 may use the following method to determine whether there is a metal foreign matter in the area of the target coil: when a difference between an amplitude of the fifth signal and an amplitude of the fourth signal is less than a second specified value, determining, by the determining module 405, that there is no metal foreign matter in the area of the target coil; or when a difference between an amplitude of the fifth signal and an amplitude of the fourth signal is greater than or equal to the second specified value, determining, by the determining module 405, that there is a metal foreign matter in the area of the target coil.

In a possible implementation, after the generating, by the phase-lock control module 401, a fifth signal based on the difference between the phase of the first signal and the phase of the third signal, and before the generating the frequency-adjusted first signal based on the fifth signal, the phase-lock control module 401 may further filter out a harmonic component of the fifth signal. This improves control precision of the phase-lock control module 401.

In a possible implementation, when the resonance module 403 further includes at least one switch, the at least one foreign-matter detection coil and the at least one resonant capacitor are connected in parallel and/or in series through the at least one switch. When the apparatus 400 further includes a charging control module 406, the charging control module 406 may select the target coil and the target capacitor by controlling the switch in the resonance module 403.

In a possible implementation, when the apparatus 400 further includes a charging control module 406, if the foregoing steps (1) to (6) are performed before the wireless charger charges the to-be-charged device (a device supporting a wireless charging function), after the determining module 405 determines that there is a metal foreign matter in the area of the target coil, the charging control module 406 may further disable a charging function of the wireless charger or the to-be-charged device. After the metal foreign matter is cleared, the charging control module 406 enables the charging function of the wireless charger or the to-be-charged device. Alternatively, after the determining module 405 determines that there is no metal foreign matter in the area of the target coil, the charging control module 406 may further enable a charging function of the wireless charger or the to-be-charged device. If the foregoing steps (1) to (6) are performed in a process in which the wireless charger charges the to-be-charged device, after the determining module 405 determines that there is a metal foreign matter in the area of the target coil, the charging control module 406 may further adjust transmit power of the wireless charger, or turn off the wireless charger, or disable a charging function of the to-be-charged device, so as to ensure secure running of the wireless charging system.

It should be noted that the foregoing method for detecting a metal foreign matter in a wireless charging system is implemented based on the apparatus 400 for detecting a metal foreign matter in a wireless charging system, and related technical features of the apparatus 400 are described in detail above with reference to the accompanying drawings. Therefore, details are not described herein again. For details, refer to related descriptions of the apparatus 400.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device, to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. An apparatus for detecting a metal foreign matter in a wireless charging system, wherein the wireless charging system comprises a wireless charger and a to-be-charged device, and the apparatus comprises a phase-lock control module, an excitation module, a resonance module, a signal collection module, and a determining module, wherein an output end of the phase-lock control module is connected to all of a first input end of the phase-lock control module, an input end of the excitation module, and an input end of the determining module, a second input end of the phase-lock control module is connected to an output end of the signal collection module, an input end of the signal collection module is connected to an output end of the resonance module, and an input end of the resonance module is connected to an output end of the excitation module;
    the phase-lock control module is configured to output a first signal to the excitation module, wherein the first signal is used to control a frequency of a second signal generated by the excitation module;
    the excitation module is configured to: generate the second signal based on the first signal, and output the second signal to the resonance module, wherein the frequency of the second signal is determined based on a frequency of the first signal, and the second signal is used to excite the resonance module;
    the resonance module comprises at least one foreign-matter detection coil and at least one resonant capacitor, and is configured to generate a third signal under excitation of the second signal by using a resonant circuit comprising a target coil and a target capacitor, wherein the at least one foreign-matter detection coil is connected to the at least one resonant capacitor, the target coil is one or more of the at least one foreign-matter detection coil, the target capacitor is one or more of the at least one resonant capacitor, the at least one foreign-matter detection coil is distributed above a transmit coil of the wireless charger or a receive coil of the to-be-charged device, and an area of the at least one foreign-matter detection coil cover an area of the transmit coil or an area of the receive coil;
    the signal collection module is configured to: collect the third signal, and output the third signal to the phase-lock control module;
    the phase-lock control module is further configured to adjust the frequency of the output first signal based on a difference between a phase of the first signal and a phase of the third signal, wherein a difference between a phase of the frequency-adjusted first signal and the phase of the third signal is less than a first specified value, and a frequency of the second signal that is generated by the excitation module based on the frequency-adjusted first signal is the same as a resonance frequency of the resonant circuit; and
    the determining module is configured to: determine, based on the frequency-adjusted first signal and a pre-stored fourth signal, whether there is a metal foreign matter in an area of the target coil, or determine, based on a fourth signal and the difference between the phase of the first signal and the phase of the third signal, whether there is a metal foreign matter in an area of the target coil, wherein the fourth signal is a signal that is output by the resonant circuit in a resonant state when there is no metal foreign matter in the area of the target coil.

2. The apparatus according to claim 1, further comprising a signal processing module, wherein an input end of the signal processing module is connected to the output end of the signal collection module, and an output end of the signal processing module is connected to the second input end of the phase-lock control module; and
    and when the first signal that is output by the phase-lock control module is a digital signal, the signal processing module is configured to: convert the third signal into a digital signal, and output the digital signal corresponding to the third signal to the second input end of the phase-lock control module.

3. The apparatus according to claim 1, wherein the phase-lock control module comprises a phase detector and a voltage-controlled oscillator, wherein an input end of the voltage-controlled oscillator is connected to an output end of the phase detector, an output end of the voltage-controlled oscillator is connected to all of a first input end of the phase detector, the input end of the determining module, and the input end of the excitation module, and a second input end of the phase detector is connected to the output end of the signal collection module;
    the phase detector is configured to: generate a fifth signal based on the difference between the phase of the first signal and the phase of the third signal, and output the fifth signal to the voltage-controlled oscillator; and
    the voltage-controlled oscillator is configured to generate the frequency-adjusted first signal based on the fifth signal.

4. The apparatus according to claim 1, wherein the determining module is specifically configured to: when a difference between a frequency of the frequency-adjusted first signal and a frequency of the fourth signal is less than a second specified value, determine that there is no metal foreign matter in the area of the target coil; or
    when a difference between a frequency of the frequency-adjusted first signal and a frequency of the fourth signal is greater than or equal to a second specified value, determine that there is a metal foreign matter in the area of the target coil.

5. The apparatus according to claim 1, wherein the phase-lock control module comprises a phase detector and a voltage-controlled oscillator, wherein an output end of the voltage-controlled oscillator is connected to both a first input end of the phase detector and the input end of the excitation module, a second input end of the phase detector is connected to the output end of the signal collection module, and an output end of the phase detector is connected to both an input end of the voltage-controlled oscillator and the input end of the determining module;
    the phase detector is configured to: generate a fifth signal based on the difference between the phase of the first signal and the phase of the third signal, and output the fifth signal to the voltage-controlled oscillator and the determining module; and the voltage-controlled oscillator is configured to generate the frequency-adjusted first signal based on the fifth signal.

6. The apparatus according to claim 5, wherein the determining module is specifically configured to: when a difference between an amplitude of the fifth signal and an amplitude of the fourth signal is less than a third specified value, determine that there is no metal foreign matter in the area of the target coil; or when a difference between corresponding parameter values of the fifth signal and the fourth signal is greater than or equal to the second specified value, determine that there is a metal foreign matter in the area of the target coil.

7. The apparatus according to claim 3, wherein the phase-lock control module further comprises a filter, wherein an input end of the filter is connected to the output end of the phase detector, and an output end of the filter is connected to the input end of the voltage-controlled oscillator; and the filter is configured to: filter out a harmonic component of the fifth signal, and output a filtered fifth signal to the voltage-controlled oscillator.

8. The apparatus according to claim 1, wherein the phase-lock control module comprises a phase detector, a filter, and a voltage-controlled oscillator, wherein an output end of the voltage-controlled oscillator is connected to both a first input end of the phase detector and the input end of the excitation module, a second input end of the phase detector is connected to the output end of the signal collection module, an output end of the phase detector is connected to an input end of the filter, and an output end of the filter is connected to both an input end of the voltage-controlled oscillator and the input end of the determining module, wherein the phase detector is configured to: generate a fifth signal based on the difference between the phase of the first signal and the phase of the third signal, and output the fifth signal to the filter;

the filter is configured to: filter out a harmonic component of the fifth signal, and output a filtered fifth signal to the voltage-controlled oscillator and the determining module; and the voltage-controlled oscillator is configured to generate the frequency-adjusted first signal based on the filtered fifth signal.

9. The apparatus according to claim 8, wherein the determining module is specifically configured to: when a difference between an amplitude of the filtered fifth signal and an amplitude of the fourth signal is less than a second specified value, determine that there is no metal foreign matter in the area of the target coil; or when a difference between an amplitude of the filtered fifth signal and an amplitude of the fourth signal is greater than or equal to the second specified value, determine that there is a metal foreign matter in the area of the target coil.

10. The apparatus according to claim 1, wherein the excitation module is a first power amplifier, wherein an output end of the first power amplifier is connected to both a first input end of the first power amplifier and the input end of the resonance module, and a second input end of the first power amplifier is connected to the output end of the phase-lock control module.

11. The apparatus according to claim 1, wherein the excitation module is a voltage-type converter or a current-type converter.

12. The apparatus according to claim 1, wherein the resonance module further includes at least one switch, and the at least one foreign-matter detection coil and the at least one resonant capacitor are connected in parallel and/or in series through the at least one switch.

13. The apparatus according to claim 12, further comprising a charging control module, wherein the charging control module is connected to all of the at least one switch, an output end of the determining module, and the transmit coil, and is configured to: control a status of the at least one switch, and control a working status of the transmit coil based on a determining result of the determining module; or the charging control module is connected to all of the at least one switch, an output end of the determining module, and the receive coil, and is configured to: control a status of the at least one switch, and control a working status of the receive coil based on a determining result of the determining module.

14. A wireless charger, comprising the apparatus for detecting a metal foreign matter in a wireless charging system according to claim 1.

15. A method for detecting a metal foreign matter in a wireless charging system, wherein the method is applied to an apparatus for detecting a metal foreign matter in the wireless charging system, and the apparatus comprises a phase-lock control module, an excitation module, a resonance module, a signal collection module, and a determining module, wherein an output end of the phase-lock control module is connected to all of a first input end of the phase-lock control module, an input end of the excitation module, and an input end of the determining module, a second input end of the phase-lock control module is connected to an output end of the signal collection module, an input end of the signal collection module is connected to an output end of the resonance module, and an input end of the resonance module is connected to an output end of the excitation module; and the method comprises:

outputting, by the phase-lock control module, a first signal to the excitation module, wherein the first signal is used to control a frequency of a second signal generated by the excitation module;

generating, by the excitation module, the second signal based on the first signal, and outputting the second signal to the resonance module, wherein the frequency of the second signal is determined based on a frequency of the first signal, and the second signal is used to excite the resonance module;

generating, by a resonant circuit comprising a target coil and a target capacitor in the resonance module, a third signal under excitation of the second signal, wherein the resonance module comprises at least one foreign-matter detection coil and at least one resonant capacitor, the at least one foreign-matter detection coil is connected to the at least one resonant capacitor, the target coil is one or more of the at least one foreign-matter detection coil, the target capacitor is one or more of the at least one resonant capacitor, the at least one foreign-matter detection coil is distributed above a transmit coil of the wireless charger or a receive coil of the to-be-charged device, and an area of the at least one foreign-matter detection coil can cover an area of the transmit coil or an area of the receive coil;

collecting, by the signal collection module, the third signal, and outputting the collected third signal to the phase-lock control module;

adjusting, by the phase-lock control module, the frequency of the output first signal based on a difference between a phase of the first signal and a phase of the third signal, wherein a difference between a phase of the frequency-adjusted first signal and the phase of the third signal is less than a first specified value, and a frequency of the second signal that is generated by the excitation module based on the frequency-adjusted first signal is the same as a resonance frequency of the resonant circuit; and determining, by the determining module based on the frequency-adjusted first signal and a pre-stored fourth signal, whether there is a metal foreign matter in an area of the target coil, or determining, based on the fourth signal and the difference between the phase of the first signal and the phase of the third signal, whether there is a metal foreign matter in an area of the target coil, wherein the fourth signal is a signal that is output by the resonant circuit in a resonant state when there is no metal foreign matter in the area of the target coil.

16. The method according to claim 15, wherein the determining, by the determining module based on the frequency-adjusted first signal and a pre-stored fourth signal, whether there is a metal foreign matter in an area of the target coil comprises:

when a difference between a frequency of the frequency-adjusted first signal and a frequency of the fourth signal is less than a second specified value, determining, by the determining module, that there is no metal foreign matter in the area of the target coil; or when a difference between a frequency of the frequency-adjusted first signal and a frequency of the fourth signal is greater than or equal to the second specified value, determining, by the determining module, that there is a metal foreign matter in the area of the target coil.

17. The method according to claim 15, wherein the adjusting, by the phase-lock control module, the frequency of the output first signal based on a difference between a phase of the first signal and a phase of the third signal comprises:

generating, by the phase-lock control module, a fifth signal based on the difference between the phase of the first signal and the phase of the third signal, and generating the frequency-adjusted first signal based on the fifth signal.

18. The method according to claim 17, wherein the determining, by the determining module based on the frequency-adjusted first signal and a pre-stored fourth signal, whether there is a metal foreign matter in an area of the target coil comprises:

when a difference between an amplitude of the fifth signal and an amplitude of the fourth signal is less than a second specified value, determining, by the determining module, that there is no metal foreign matter in the area of the target coil; or when a difference between an amplitude of the fifth signal and an amplitude of the fourth signal is greater than or equal to the second specified value, determining, by the determining module, that there is a metal foreign matter in the area of the target coil.

19. The method according to claim 15, wherein the resonance module further comprises at least one switch, and the at least one foreign-matter detection coil and the at least one resonant capacitor are connected in parallel and/or in series through the at least one switch; and the apparatus further comprises a charging control module, wherein the charging control module is connected to all of the at least one switch, an output end of the determining module, and the transmit coil;

before the excitation module outputs the second signal to the resonance module, the charging control module controls a status of the at least one switch, and selects the target coil and the target capacitor; and after the determining module determines whether there is a metal foreign matter in the area of the target coil, the charging control module further controls a working status of the transmit coil based on a determining result of the determining module.

20. The method according to claim 15, wherein the resonance module further comprises at least one switch, and the at least one foreign-matter detection coil and the at least one resonant capacitor are connected in parallel and/or in series through the at least one switch; and the apparatus further comprises a charging control module, wherein the charging control module is connected to all of the at least one switch, an output end of the determining module, and the receive coil;

before the excitation module outputs the second signal to the resonance module, the charging control module controls a status of the at least one switch, and selects the target coil and the target capacitor; and after the determining module determines whether there is a metal foreign matter in the area of the target coil, the charging control module further controls a working status of the receive coil based on a determining result of the determining module.

* * * * *

UNITED STATES PATENT AND TRADEMARK OFFICE
CERTIFICATE OF CORRECTION

PATENT NO. : 11,870,275 B2
APPLICATION NO. : 17/134084
DATED : January 9, 2024
INVENTOR(S) : Yunhe Mao et al.

It is certified that error appears in the above-identified patent and that said Letters Patent is hereby corrected as shown below:

In the Specification

Column 21, Line 19, change "and then foreign-matter" to --and the n foreign-matter--.

Signed and Sealed this
Sixth Day of February, 2024

Katherine Kelly Vidal
*Director of the United States Patent and Trademark Office*